United States Patent
Stevens et al.

(10) Patent No.: US 10,040,385 B2
(45) Date of Patent: Aug. 7, 2018

(54) VEHICLE ACCESS RAMP

(71) Applicants: Errol Keith Stevens, Westminster, CO (US); Rebette Stevens, Westminster, CO (US)

(72) Inventors: Errol Keith Stevens, Westminster, CO (US); Rebette Stevens, Westminster, CO (US)

(*) Notice: Subject to any disclaimer, the term of this patent is extended or adjusted under 35 U.S.C. 154(b) by 0 days.

(21) Appl. No.: 15/712,629

(22) Filed: Sep. 22, 2017

(65) Prior Publication Data
US 2018/0105091 A1    Apr. 19, 2018

Related U.S. Application Data

(60) Provisional application No. 62/495,837, filed on Sep. 26, 2016.

(51) Int. Cl.
*B60P 1/43*     (2006.01)
*B60P 3/04*     (2006.01)

(52) U.S. Cl.
CPC ................. *B60P 1/431* (2013.01); *B60P 3/04* (2013.01); *H05K 999/99* (2013.01)

(58) Field of Classification Search
CPC ....................................................... B60P 1/431
See application file for complete search history.

(56) References Cited

U.S. PATENT DOCUMENTS

| | | |
|---|---|---|
| 276,685 A | 5/1883 | Harley |
| 606,520 A | 6/1898 | Darrah |
| 701,320 A | 6/1902 | Fisher |
| 963,918 A | 7/1910 | Miller |
| 1,699,882 A | 1/1929 | Ferguson |
| 3,104,142 A | 9/1963 | Knape et al. |
| 3,511,393 A | 5/1970 | Abromavage et al. |
| 3,613,920 A | 10/1971 | Flamm |
| 3,642,156 A | 2/1972 | Stenson |
| 3,711,882 A | 1/1973 | Iller |
| 3,870,170 A | 3/1975 | Noble et al. |
| 4,078,678 A | 3/1978 | Tordella |
| 4,370,007 A | 1/1983 | Fier |
| 4,527,941 A | 7/1985 | Archer |
| 4,571,144 A | 2/1986 | Guidry et al. |
| 4,601,632 A | 7/1986 | Agee |
| 4,624,619 A | 11/1986 | Uher |
| 4,628,561 A | 12/1986 | Kushniryk |
| 4,685,857 A | 8/1987 | Goeser et al. |
| D300,073 S | 2/1989 | Crump |

(Continued)

OTHER PUBLICATIONS

Bazaraa, "Nissan unveils perfect car for Britain's dog lovers with pull out shower and camera to broadcast pooch's antics," Mirror, 2017, retrieved from https://www.mirror.co.uk/news/uk-news/nissan-unveils-perfect-car-britains-9934760, 6 pages.

*Primary Examiner* — Jonathan Snelting
(74) *Attorney, Agent, or Firm* — Sheridan Ross PC

(57) ABSTRACT

A vehicle access ramp system is provided. In various embodiments, methods, devices and systems are provided to facilitate the ingress and egress of various objects and beings to and from a vehicle. In some embodiments, a ramp system is provided that is arranged to integrate with an existing compartment of a vehicle and which maintains the utility of the existing compartment.

15 Claims, 21 Drawing Sheets

(56) References Cited

U.S. PATENT DOCUMENTS

| | | | |
|---|---|---|---|
| 4,900,217 A * | 2/1990 | Nelson | B60P 1/431 14/71.1 |
| 5,257,894 A | 11/1993 | Grant | |
| 5,312,149 A | 5/1994 | Boone | |
| 5,536,058 A * | 7/1996 | Otis | B60P 1/435 296/61 |
| 5,540,474 A | 7/1996 | Holland | |
| 5,803,523 A * | 9/1998 | Clark | B60P 1/435 14/71.1 |
| D412,224 S | 7/1999 | Adler | |
| 5,980,007 A | 11/1999 | Singh | |
| 6,099,233 A | 8/2000 | Craik | |
| 6,267,082 B1 | 7/2001 | Naragon et al. | |
| 6,378,927 B1 | 4/2002 | Parry-Jones et al. | |
| 6,463,613 B1 | 10/2002 | Thompson | |
| 6,484,344 B1 * | 11/2002 | Cooper | A61G 3/061 14/71.1 |
| 6,701,563 B2 | 3/2004 | Schomaker et al. | |
| 6,715,177 B1 | 4/2004 | Julander | |
| 6,749,246 B2 | 6/2004 | Landwehr | |
| 6,928,959 B1 | 8/2005 | Trauernicht et al. | |
| 7,284,781 B2 | 10/2007 | Grant | |
| 7,302,725 B2 * | 12/2007 | Thygesen | B60P 1/43 14/69.5 |
| 7,451,512 B2 * | 11/2008 | Fullerton | A61G 3/063 14/69.5 |
| 7,488,025 B1 | 2/2009 | Roberson | |
| 7,827,641 B2 | 11/2010 | Hoffman et al. | |
| 7,958,586 B1 | 6/2011 | Carter | |
| 8,117,994 B1 | 2/2012 | Goodlow | |
| 8,899,188 B1 | 12/2014 | Douglas et al. | |
| D756,573 S | 5/2016 | Jakubowski et al. | |
| 2004/0160079 A1 | 8/2004 | Harper et al. | |
| 2007/0237614 A1 | 10/2007 | Johnson | |
| 2008/0105215 A1 | 5/2008 | Simpson et al. | |
| 2010/0242189 A1 * | 9/2010 | Goin | B60P 1/431 14/71.1 |
| 2014/0123910 A1 | 5/2014 | Rorke et al. | |
| 2014/0356117 A1 * | 12/2014 | Barger | G01N 23/04 414/523 |
| 2014/0377046 A1 | 12/2014 | Aiello | |
| 2016/0050882 A1 | 2/2016 | Longo | |

\* cited by examiner

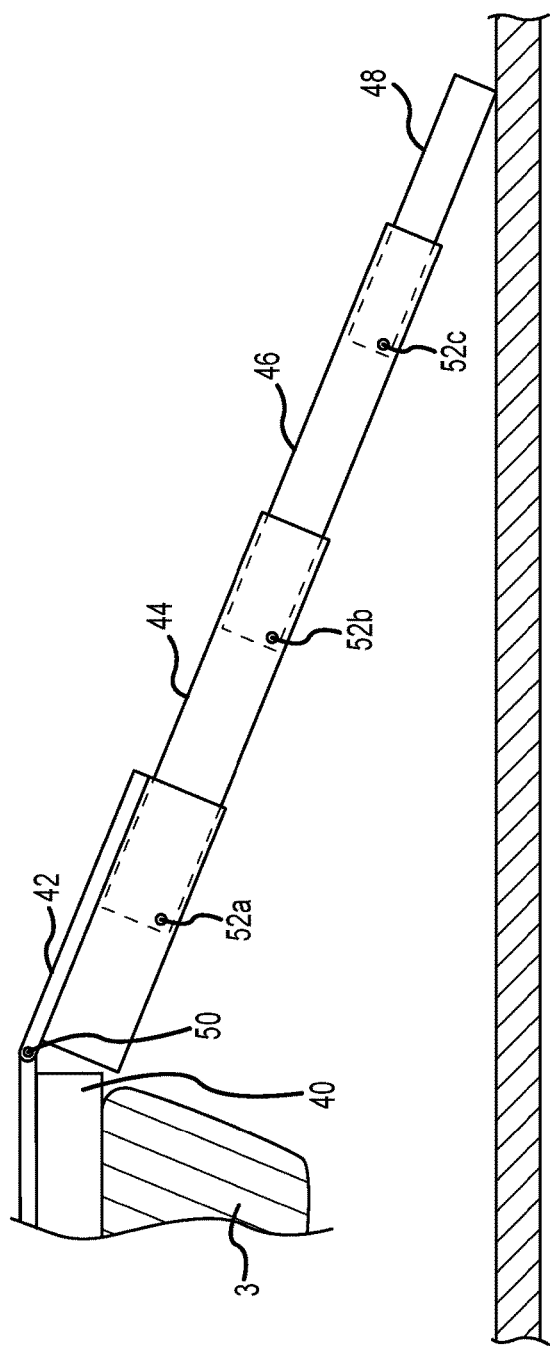
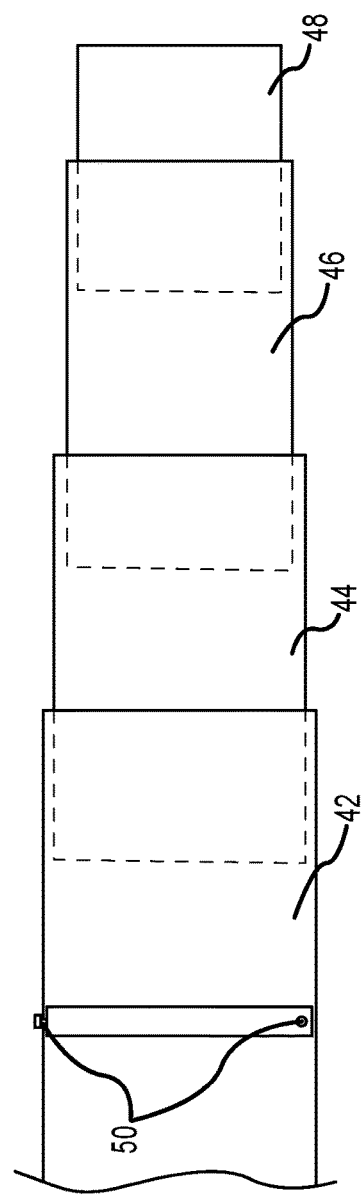

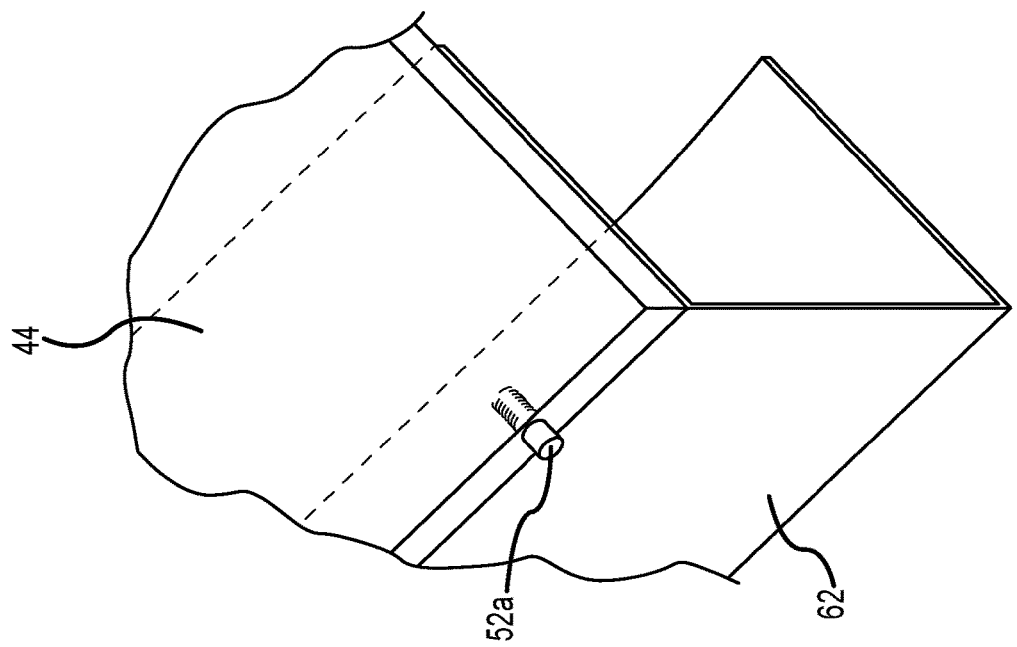
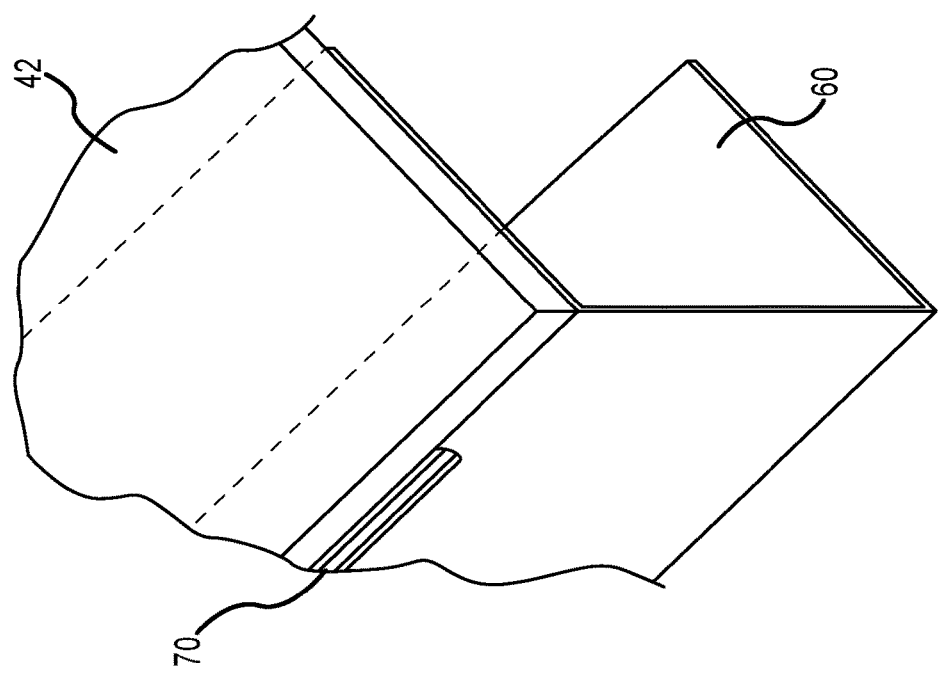
FIG.3D

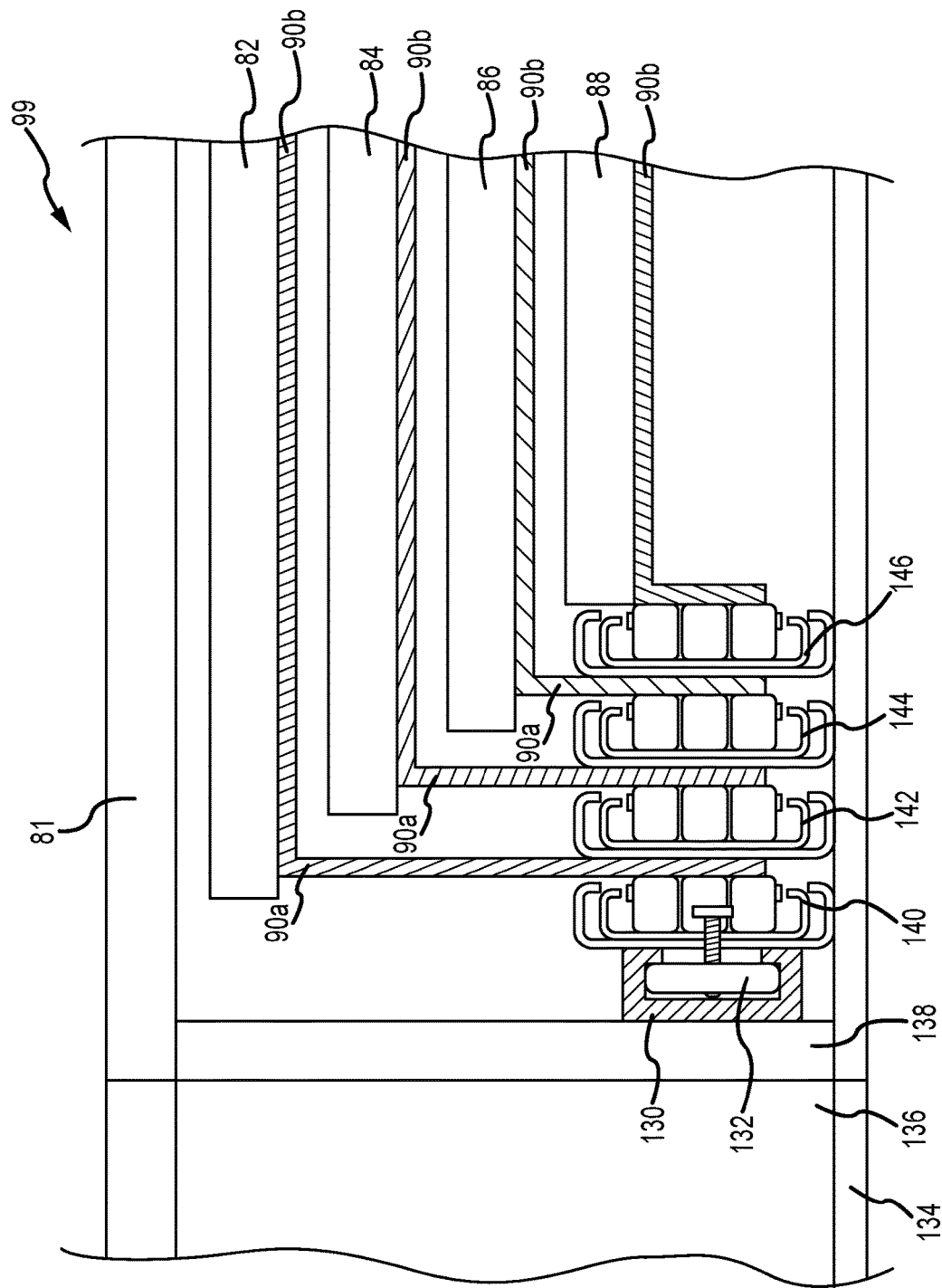

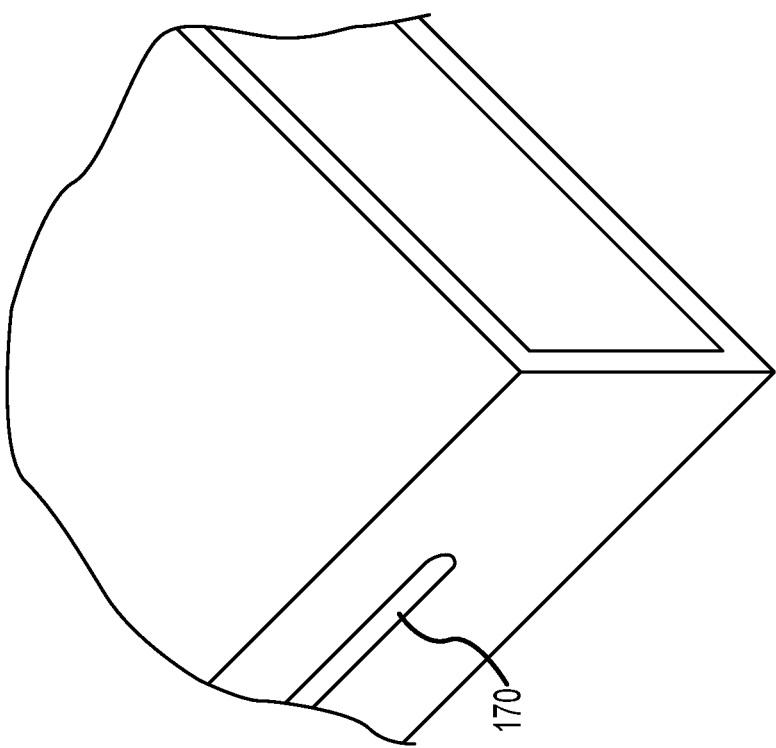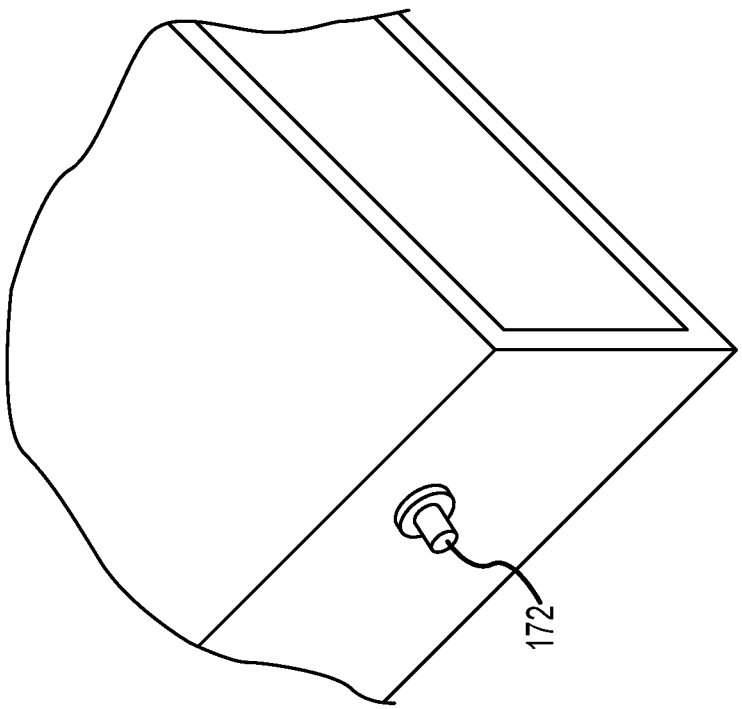
FIG.5C

VEHICLE ACCESS RAMP

This U.S. Non-Provisional Patent Application claims the benefit of priority from U.S. Provisional Patent Application Ser. No. 62/495,837, filed Sep. 26, 2016, the entire disclosure of which is hereby incorporated by reference in its entirety.

FIELD

The present disclosure relates generally to vehicle access features. More specifically, embodiments of the present disclosure relate to vehicle access ramps that facilitate ingress and egress of various beings and objects to and from a vehicle.

BACKGROUND

Pets including canines are frequently transported in the rear storage area of a vehicle. The rear compartment of a sport utility vehicle ("SUV"), for example, provides a safe and convenient area for transporting canines and other pets. However, one drawback to this method of transport is that many of such storage areas are positioned relatively high above a ground surface. While young and/or athletic canines, for example, may be able to jump in and out of a vehicle, many other canines and animals may not possess this ability. Mature and/or large animals may be difficult to lift and manipulate during vehicle loading and unloading.

Existing ramps including U.S. Pat. No. 7,493,874 to Simpson et al., which is hereby incorporated by reference in its entirety, comprise moveable features that are operable to be temporarily provided in a position of use and are removed or disassembled for transport. These non-integrated ramps are generally placed inside a vehicle while not in use and occupy a significant amount of cargo and passenger space. The devices may also present hazards as loose objects within a moving vehicle. Additionally, such devices may be easily lost or forgotten.

Other known vehicle access devices fail to provide for various ergonomic features and structural features as shown and described herein.

SUMMARY

Accordingly, there has been a long-felt but unmet need to provide a vehicle ramp system that is provided as a substantially integrated component of a vehicle and which is suitable for use by humans and pets.

In various embodiments, an integrated vehicle access ramp system is provided. Vehicle access ramp systems of the present disclosure are adapted for use by humans and with pets, wherein ingress and egress of pets is facilitated by the system. Although various embodiments of the present disclosure contemplate intended methods of use with animals, it will be recognized that the present disclosure is not so limited. Indeed, structures, features and devices of the present disclosure are adapted for use with various beings and devices and no limitation with respect to the intended use of certain embodiments is provided.

It is an object of the present disclosure to provide a pet ramp system that is adapted to remain within the confines of a vehicle and which comprises an extended position of use and a retracted position of storage. In various embodiments, a base or storage member is provided that substantially conforms to a rear storage area of a vehicle. The base member is operable to receive a plurality of segments that form an extensible ramp. The segments are provided in nested and/or stacked arrangement in a storage position. An upper portion of the base member comprises a planar member that is operable to serve as a floor or cargo surface of a vehicle. In such embodiments, a rear portion or bay of a vehicle is substantially unaffected by the ramp system and a storage volume of the vehicle is not substantially diminished.

In some embodiments, base members of the present disclosure comprise a storage area for a ramp structure and additional storage areas. For example, in some embodiments, it is contemplated that the ramp device comprises a width that is no more than 50% of a total width of the system. The remaining width of the system is therefore operable to serve as generic storage volume for various objects. This storage volume is preferably provided between upper and lower portions of the base member and on opposing sides of the ramp.

In various embodiments, ramp systems of the present disclosure are provided with structural stability wherein the system is operable to serve as the floor member of a storage area. Vertical supports are contemplated as being provided between upper and lower members of the ramp systems of the present disclosure. The vertical supports provide a gap space within which an extendable ramp and other objects may be housed. Additionally, the vertical supports provide for sufficient structural integrity such that an upper portion of the structure is operable to serve as a weight-bearing floor member.

In various embodiments, the present disclosure contemplates one or more friction-reducing members to promote the slidability of at least one portion of an extendable ramp system. Friction-reducing member and means of the present disclosure are contemplated as comprising coatings, Teflon coatings, ball bearing members, wheel-and-track systems, prefabricated sliders (e.g. cabinet and drawer sliders), and similar devices.

In some embodiments, the present disclosure contemplates a climate control system for a vehicle. Climate control features of the present disclosure are contemplated as being provided in combination with ramp systems of the present disclosure, and as stand-alone features regardless of whether or not a ramp system is provided. In some embodiments, climate control features comprise an ultra-violet ("UV") filter member. In various embodiments, the filter member comprises a vinyl-coated polyester fabric such as SUNTEX 90™, for example, which is commercially available from PHIFER™. In various embodiments, UV filter members comprise at least one of a woven nylon fabric, a molded plastic panel, and/or vinyl-coated polyester.

In various embodiments, at least one UV filter member is provided in the form of a textile or a plastic. The filter member is provided as a cover and is contemplated as being provided on at least one of: one or more vertical sidewalls of a vehicle compartment and/or the interior of vehicle windows.

In some embodiments, climate control systems of the present disclosure comprise at least one fan. In certain embodiments, at least one 12-volt fan is provided to promote the circulation of ambient air. One or more fans may be provided in combination with a vehicle access ramp system as shown and described herein. In further embodiments, it is contemplated that a cooling system is provided with a vehicle access ramp system. In some embodiments, at least one cooling line is provided to form a channel for a cooling fluid. The cooling fluid may be in communication with and/or connected to a pre-existing air conditioning system of a vehicle.

In one embodiment, a vehicle access ramp is provided that comprises a primary housing operable to fit within the confines of a portion of a vehicle. The primary housing comprises an upper housing surface, a lower housing surface, and a plurality of interior wall members wherein the interior wall members comprise substantially vertical members extending between the upper housing surface and the lower housing surface. An extensible ramp is provided between two of the interior wall members, and the extensible ramp comprises a plurality of segments wherein each of the plurality of segments is translatable relative to an adjacent segment and relative to the primary housing. At least one of the segments comprises a hinge member and is rotatable relative to the primary housing about at least one axis. At least one of the plurality of segments comprises a molded member having a convex portion and a concave portion, the convex portion operable to be received by a first adjacent segment and the concave portion operable to receive a second adjacent segment. At least one storage compartment is provided between the upper housing surface and the lower housing surface and on an opposing side of an interior wall member relative to the extensible ramp. The extensible ramp comprises a first position of storage and a second position of use, the first position of storage comprising a position wherein each of the plurality of segments is confined within primary housing, and the second position of use comprises an extended position wherein the extensible ramp extends between the primary housing and a location that is vertically and horizontally offset from the primary housing. A cover member is provided that is operable to substantially enclose the at least one storage compartment when the extensible ramp is provided in the first position, wherein the cover member comprises a rollable mat that is operable to substantially enclose the at least one storage compartment and is further operable to be provided as a buffer between the extensible ramp and a portion of a vehicle.

In one embodiment, a vehicle access ramp is provided that comprises a primary housing operable to fit within the confines of a portion of a vehicle. The primary housing comprises an upper housing surface, the upper housing surface being arranged to replace an existing cargo surface of a vehicle. An extensible ramp is provided at least partially within the primary housing. The extensible ramp comprises a plurality of segments and wherein each of the plurality of segments is translatable relative to an adjacent segment and relative to the primary housing. At least one of the segments comprises a hinge member and is rotatable relative to the primary housing about at least one axis. A first storage compartment is provided within the primary housing for receiving the extensible ramp. A second storage compartment provided within the primary housing. The extensible ramp comprises a first position of storage and a second position of use, the first position of storage comprises a position wherein each of the plurality of segments is confined within primary housing, and the second position of use comprises an extended position wherein the extensible ramp extends between the primary housing and a location that is vertically and horizontally offset from the primary housing. A cover member is provided that is operable to substantially enclose the at least one storage compartment when the extensible ramp is provided in the first position.

In one embodiment, a vehicle access ramp is provided that comprises a housing operable to fit within the confines of a portion of a vehicle. The housing comprises an upper housing surface, the upper housing surface being arranged to replace an existing cargo surface of a vehicle. An extensible ramp is provided that comprises a plurality of segments and wherein each of the plurality of segments is translatable relative to an adjacent segment and relative to the housing. A storage compartment is provided within the housing for receiving the extensible ramp. The extensible ramp comprises a first position of storage and a second position of use, the first position of storage comprising a position wherein each of the plurality of segments is confined within primary housing, and the second position of use comprises an extended position wherein the extensible ramp extends between the primary housing and a location that is vertically and horizontally offset from the primary housing. A cover member is provided that is operable to substantially enclose at least one storage compartment when the extensible ramp is provided in the first position.

In various embodiments, vehicle access ramp systems are contemplated that comprise manually powered and manually operated extendable ramps. In further embodiments, it is contemplated that ramp systems of the present disclosure comprise motor powered and/or hydraulic systems that are operable to extend and/or retract a ramp. For example, it is contemplated that at least one servo motor is provided in certain embodiments to selectively deploy and/or retract a ramp comprising a plurality of segments. It is further contemplated that one or more segments of a ramp comprise hydraulic pistons to control the extension and retraction of the ramp and segment(s).

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of these inventions.

FIG. 3A is a side elevation view of a vehicle access ramp system according to one embodiment of the present disclosure.

FIG. 3B is a top plan view of the vehicle access ramp system of the embodiment of FIG. 3A.

FIG. 3D is detailed view of a portion of the vehicle access ramp system according to the embodiment of FIG. 3A.

FIG. 4E is a detailed side elevation view of the vehicle access ramp according to the embodiment of FIG. 4A.

FIG. 5C is a perspective view of a vehicle access ramp component according to the embodiment of FIG. 5A.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
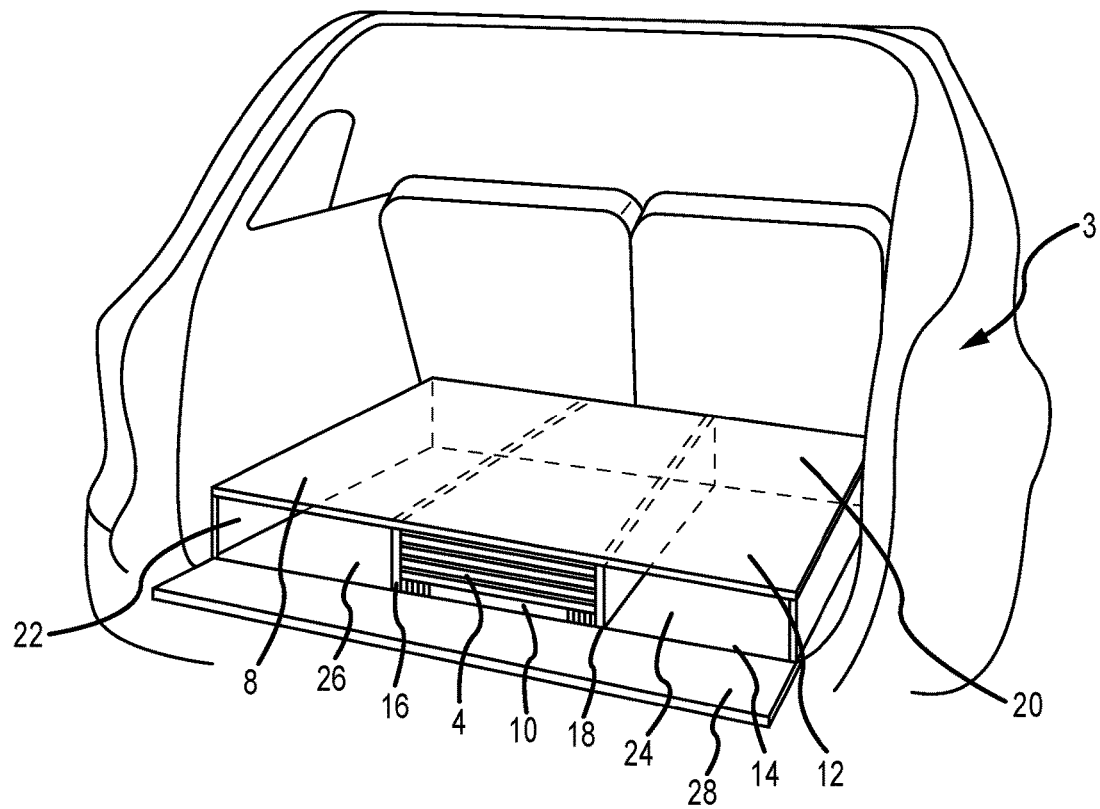
FIG. 1 is a perspective view of vehicle access ramp system according to one embodiment of the present disclosure.

FIG. 1 is a perspective view of a vehicle access ramp system 2 provided within a vehicle 3. As shown, the vehicle access ramp system 2 comprises a nested ramp 6. The ramp 6 generally comprises a telescoping ramp that is illustrated in a retracted position in FIG. 1 wherein the ramp 6 is stowed within a primary housing 8. Specifically, and as shown in FIG. 1, the system 2 further comprises a ramp-receiving cavity 10 that is at least partially defined by an upper housing surface 12, a lower housing surface 14, a first interior wall member 16 and a second interior wall member 18. When the ramp 6 is provided in the stowed position of FIG. 1, a rear storage area of the vehicle 3 is rendered operable for use as intended by the vehicle manufacturer. An upper housing surface 12 is provided as the lower region or surface of a storage area and the ramp 6 may be stowed within the vehicle without occupying a significant amount of valuable space within the vehicle.

Additional storage cavities 24, 26 are provided on opposing sides of the ramp-receiving cavity 10. The storage cavities 24, 26 are provided as generic cargo bays wherein various items may be stored and kept separate and apart from the telescoping ramp 4. As shown in FIG. 1, the ramp 4 comprises a width that occupies not more than approximately one-third of a total width of the housing 8. Accordingly, to optimize storage space the cavities 24, 26 on either side of the ramp are provided as usable storage spaces.

In some embodiments, and as shown in FIG. 1, a closure member 28 is provided. As shown in FIG. 1, the closure member 28 comprises a hinged panel that is rotatable about one or more hinge points provided proximal to a lower portion of the housing 8. In alternative embodiments, the closure member 28 is provided as a hinged panel that is rotatable about one or more points proximal to an upper portion of the housing 8. In some embodiments, and although not shown in FIG. 1, a closure member is provided that comprises a rollable mat including, for example, a rubber mat. In such embodiments, the mat is operable and arranged to secure the ramp 4 and stored objects in the storage cavities 24, 26 when provided in a rolled or closed position. Additionally, the mat is operable to provide a buffer or protector for a rear fender of the vehicle when provided in an unrolled or deployed state.

Figure 2:
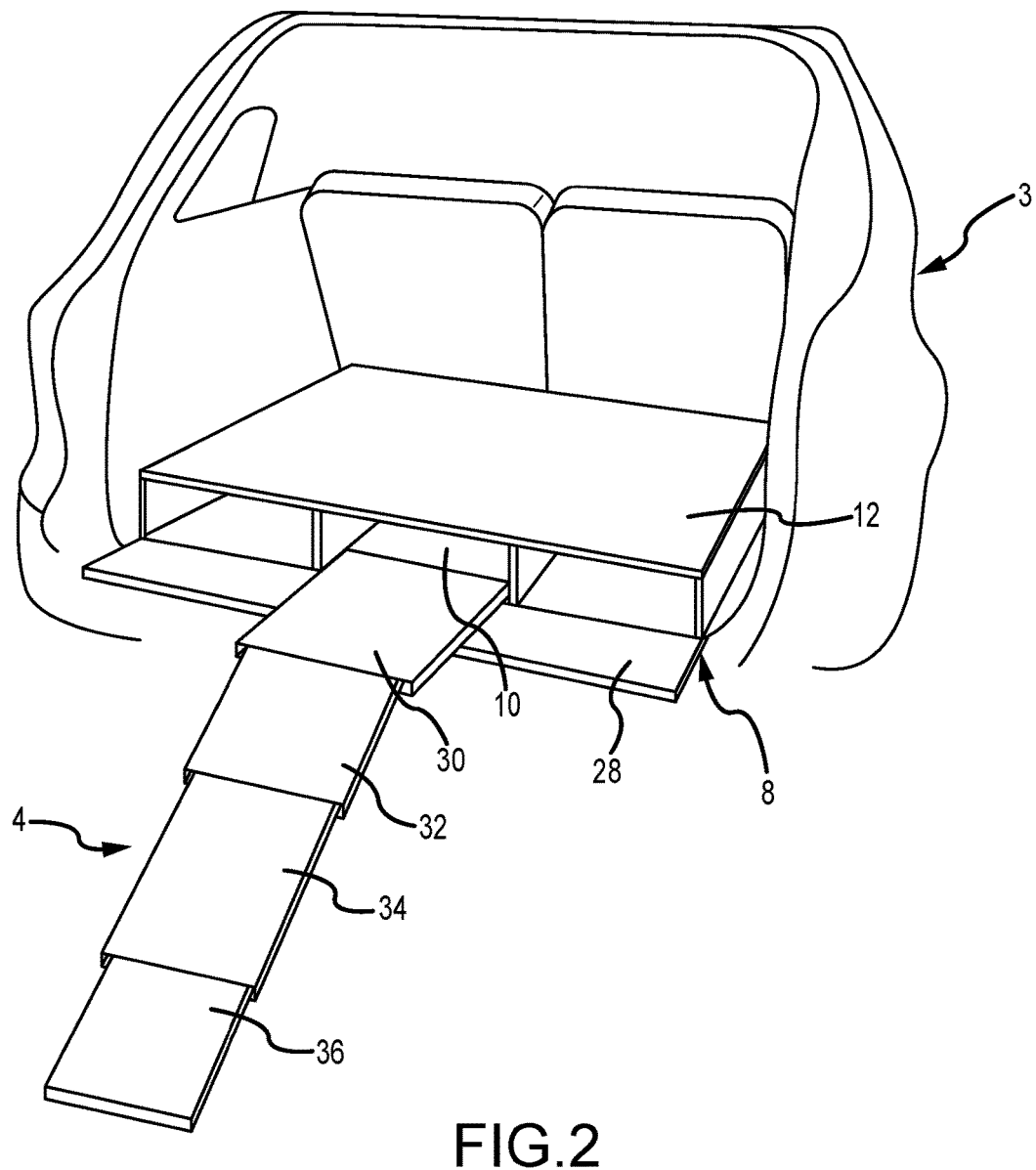
FIG. 2 is a perspective view of the vehicle access ramp system according to the embodiment of FIG. 1.

FIG. 2 is a perspective view of the vehicle access ramp system 2 according to the embodiment of FIG. 1 and wherein the ramp 4 is provided in an extended and deployed position. As shown the ramp 4 comprises a plurality of ramp segments 30, 32, 34, 36 that are slidable with respect to an adjacent segment and wherein at least the first segment 30 is slidable relative to the housing 8. In the extended position of FIG. 2, the ramp 4 extends between the housing 8 and a ground or grade surface. The ramp 4 thereby provides a means for ingress and egress for animals and objects. In various embodiments of the present disclosure, the ramp system 2 is provided and adapted for use as a pet ramp to allow a pet (e.g. dog) to walk in and out of the vehicle without having to jump or be lifted. It will be recognized, however, that systems and devices of the present disclosure are not limited to any particular intended use and it is contemplated that the ingress and egress of various objects to and from the interior of a vehicle may be facilitated by the ramp systems of the present disclosure.

As further shown in FIG. 2, at least some of the segments 30, 32, 34, 36 are slidable relative to an adjacent segment. At least the first segment 30 is slidable relative to the housing 8, and at least one segment 32 is rotatable relative to the housing 8. The hinged rotation of the second segment 32 in FIG. 2 enables the ramp 4 to be provided with an angle at which the ramp extends between the elevated portion of the vehicle 3 and the ground surface.

FIGS. 3A-3B are side elevation and top plan views of a vehicle access ramp system 2 according to one embodiment of the present disclosure. As shown, the ramp system 2 comprises a plurality of segments 40, 42, 44, 46, 48 that are slidable relative to each other and relative to a vehicle 3. A hinge 50 is provided at an interconnection between a first slidable segment 40 and a second slidable segment 42. The first slidable segment 40 preferably comprises a segment that is in communication with a housing (not shown in FIG. 3A) provided within a vehicle.

In the embodiment provided in FIGS. 3A-3B, each of the slidable segments preferably comprise an overall width W and a total thickness T that is less than an interior width and thickness of a preceding segment such that each segment is arranged to nest within an adjacent segment. Adjacent segments are slidable with respect to one another. Stop members 52a, 52b, 52c are provided to limit displacement of a segment. In some embodiments, it is contemplated that the stop members are provided such that not more than 80 percent of a length of a segment is capable of extending from an adjacent segment. In preferred embodiments, approximately 60 percent of a length of a segment is permitted to extend from an adjacent segment. The resulting overlap between adjacent segments provides structural support to each segment and the ramp generally, which is essentially a series of cantilevered beams.

Figure 3C:
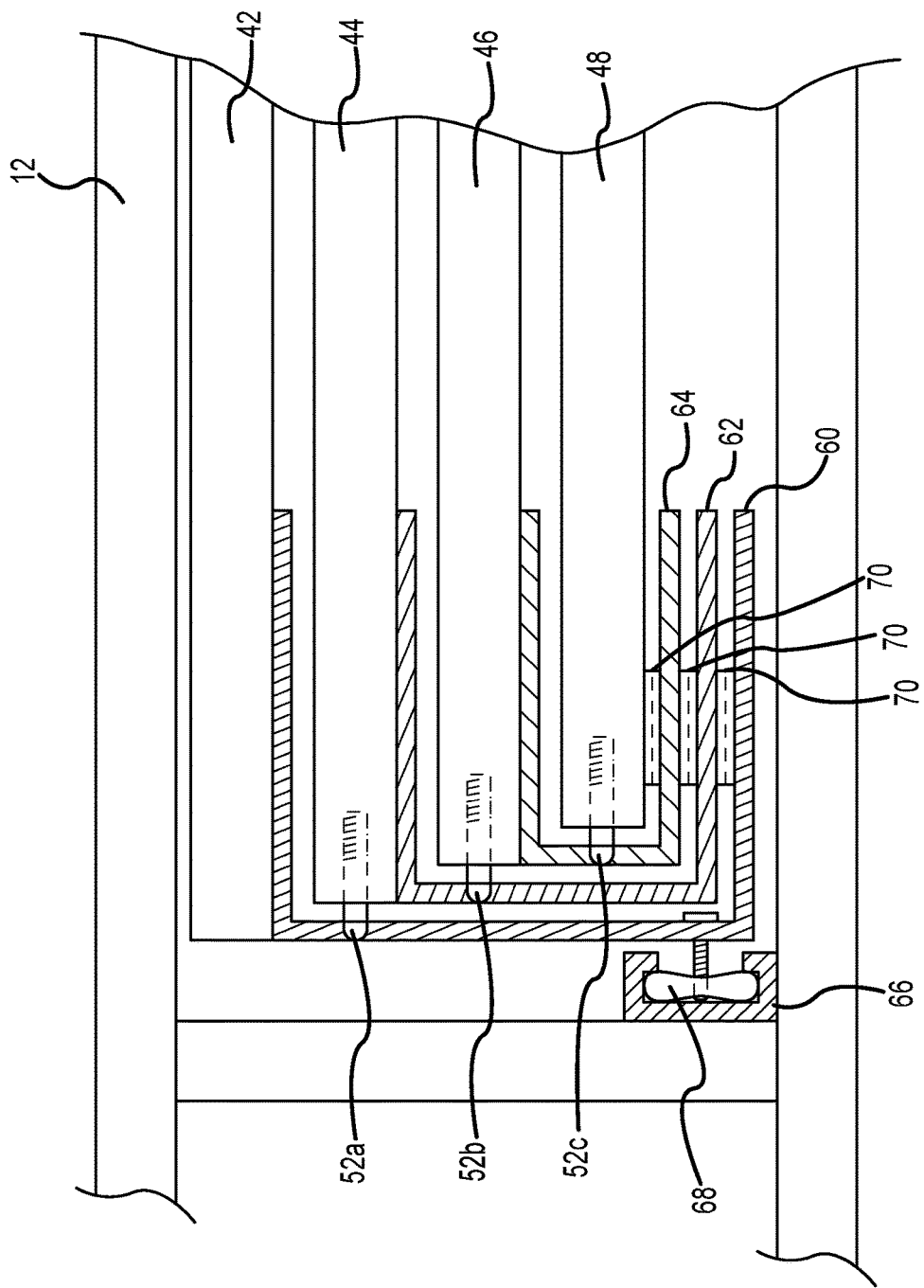
FIG. 3C is detailed view of a portion of the vehicle access ramp system according to the embodiment of FIG. 3A.

FIG. 3C is a detailed elevation view of a vehicle access ramp system 2 comprising a plurality of nested segments. As shown, each of the segments 42, 44, 46, 48, comprises a substantially planar support member that is operable to extend from the position shown in FIG. 3C. A first segment 42 is provided and supported on a first support member 60. The first support member is in communication with an elongate track member 66 and wherein the first support member 60 comprises a wheel 68 that extends into and contacts the track member 66. As will be recognized by one of ordinary skill in the art, a translation of the first support member 60 results in a movement and translation of each of the elongate track members and associated supports. As shown in FIG. 3C, the segments are fixedly attached to at least one support member. A second segment 44 is provided on and/or is secured to a second support member 62. The second segment 44 also comprises a stop 52a which extends from the second segment 44 and is slidable received within a slot in the first support member 60 to allow for slidable communication between the first support member 60 and the second support member 62. Similarly, a third segment 46 and fourth segment 48 comprise a similar construction and each comprise stop members 52b, 52c that extend from associated segments and are provided as protrusions into an elongate slot in an adjacent support member. In some embodiments, a friction-reducing member 70 is provided between segments and/or support members. Friction reducing members 70 of the present disclosure are contemplated as comprising, but are not limited to, layers of Teflon and similar materials known to comprise a relatively low coefficient of friction.

Although a system with four segments is shown in FIG. 3C, it will be recognized that systems of the present disclosure are not limited to any particular number of segments and that fewer or greater than four segments may be provided.

FIG. 3D is a perspective view of components of the vehicle access ramp system 2 according to the embodiment of FIG. 3C. As shown, a first segment 42 and a second segment 44 are provided. Each of the segments 42, 44 comprise a corresponding support member 60, 62. The second segment 44 comprises a stop 52a in the form of a male extension. The stop 52a is operable to communicate with and travel within a slot 70 provided in the first support member 60. The combination of the stop 52a and slot 70 is operable to enable and define a path of travel at least between the first segment 42 and the second segment 44. The first and second segments 42, 44 are shown in an exploded view in FIG. 3D for illustrative purposes. In an assembled state, the second segment 44 is sized and adapted to fit within an interior volume of the first support member 60 such that the stop 52a aligns with the slot 70. As shown in FIG. 3C, each successive support member and segment is sized to fit or "nest" within an adjacent support member.

In preferred embodiments, the slot 70 is sized and dimensioned to limit an amount of translation of the second member 44 to provide structural stability to the system when the ramp segments are provided in an extended position.

Figure 4A:
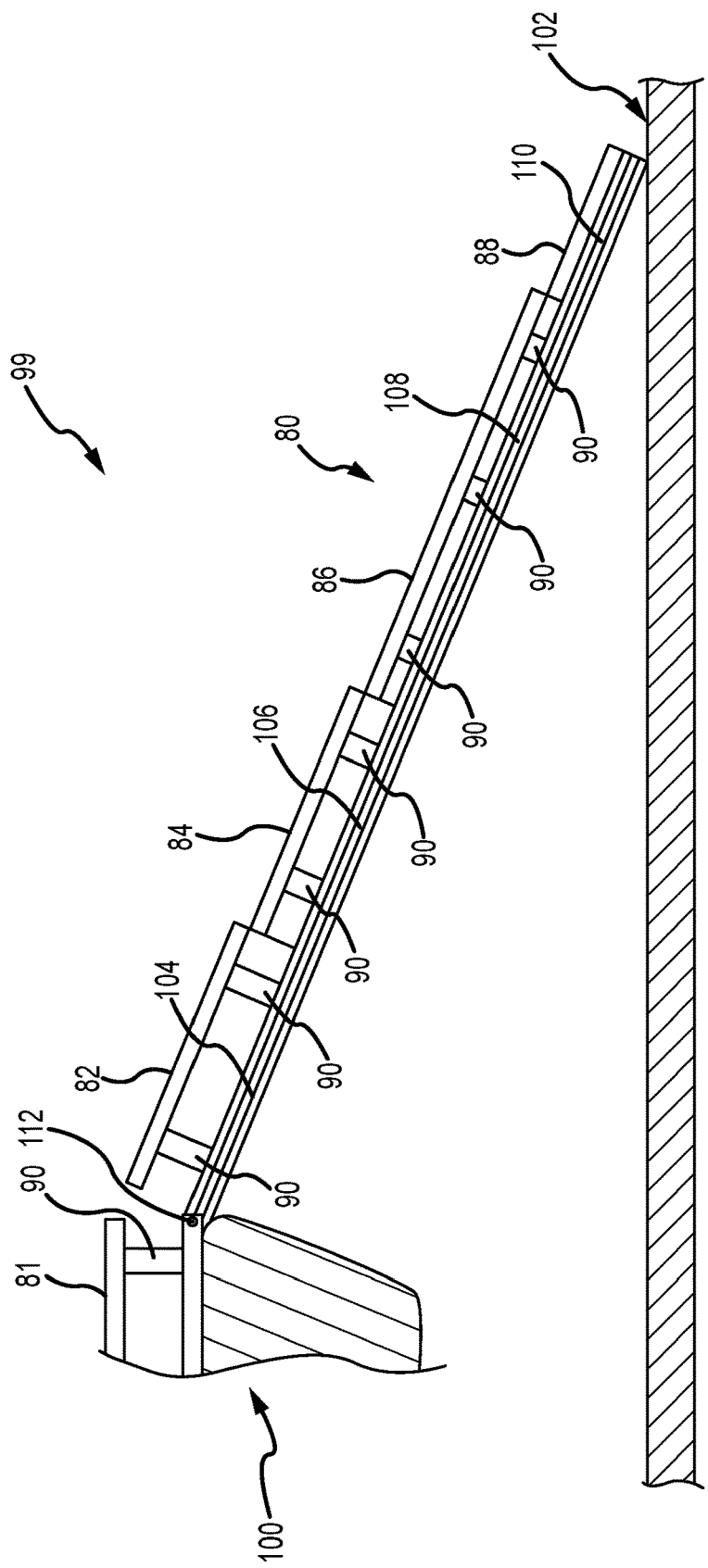
FIG. 4A is a side elevation view of a vehicle access ramp system according to one embodiment of the present disclosure.

FIG. 4A is a side elevation view of a vehicle ramp system 80 according to another embodiment of the present disclosure. As shown, the ramp system 80 comprises a plurality of segments 82, 84, 86, 88. The segments are provided in an extended position in FIG. 4A, wherein the segments extend from a vehicle 100 to a ground or grade surface 102. The plurality of segments 82, 84, 86, 88 extend sequentially from a base member 81. The base member 81 is provided within a cargo area of a vehicle 100 and in at least some embodiments is provided as a stationary device that is operable to receive the segments in a nested fashion. Each of the segments 82, 84, 86, 88 comprises a substantially planar platform that are operable for supporting the weight of an animal, for example. The segments 82, 84, 86, 88 are rendered slidable relative to one another by the provision of slide members 104, 106, 108, 110. Each of the segments 82, 84, 86, 88 comprises at least one vertical support member 90. The vertical support member(s) of each successive segments is preferably shorter and spaced more narrowly than a precedent segment, such that the segments are capable of being retracted or nested within one another.

At least one segment 82 is hingedly and slidable connected to the base member 81. A hinged connection 112 is provided to allow the segments to rotate relative to the base member 81 at least when the first segment 82 is provided in an extended position.

Figure 4B:
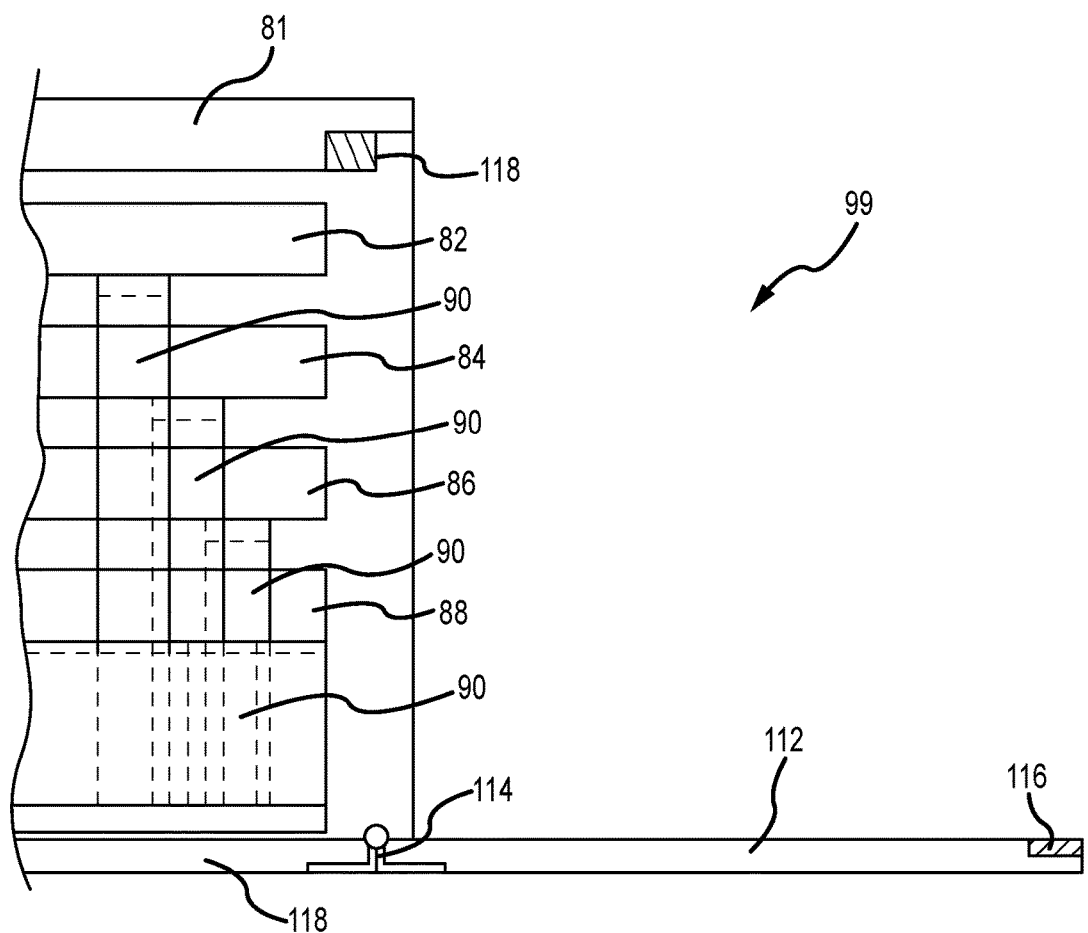
FIG. 4B is a detailed view of a portion of the vehicle access ramp according to the embodiment of FIG. 4A.

FIG. 4B is a side elevation view of a portion of the vehicle access ramp system of FIG. 4A. As shown, the ramp system 99 of FIG. 4B comprises a plurality of segments 82, 84, 86, 88 provided in a stacked or nested arrangement. Each of the segments comprise at least one vertical support 90 provide structural support to the segment and enable stacking of adjacent segments. Specifically, and as shown in FIG. 4B, a smallest segment 88 is nested within an adjacent segment 86. Both of the segments 88, 86 are nested within a third segment 84. Each of the three segments 88, 86, 84 are then nested within a largest segment 82. All four segments 82, 84, 86, 88 are slidable received and housed in a base member 81. In various embodiment, the base member 81 comprises a essentially fixed member that is provided within an interior volume of a vehicle 100. In other embodiments, it is contemplated that the base member 81 is slidable relative to the vehicle, and wherein a first segment 82 is hingedly attached to the base member 81 to allow the ramp to extend at an angle from the vehicle.

As shown in FIG. 4B, the base member 81 comprises a hinged door panel 112, which is rotatable between an open and closed position about a hinge 114 to seal and secure the storage volume in which the ramp segments are housed. The hinge is provided between a lower portion 118 of the base member 81 and the hinged door panel 112. A pair of magnetic elements 116, 118 are contemplated as being provided as a closure means for the door panel 112.

Figure 4C:
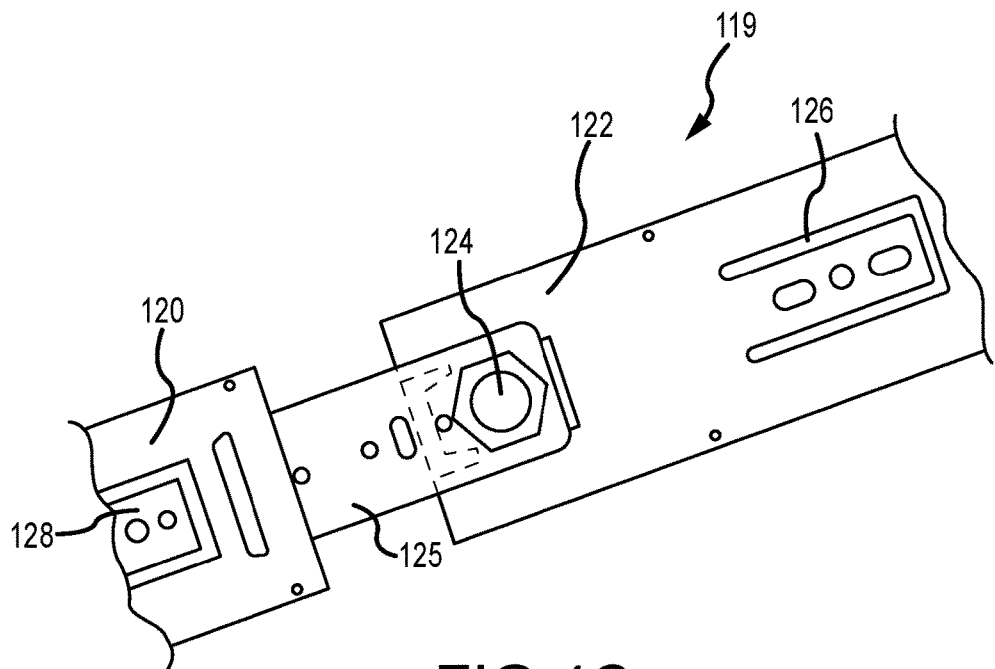
FIG. 4C is a detailed side elevation view of a component of the vehicle access ramp according to the embodiment of FIG. 4A.
Figure 4D:
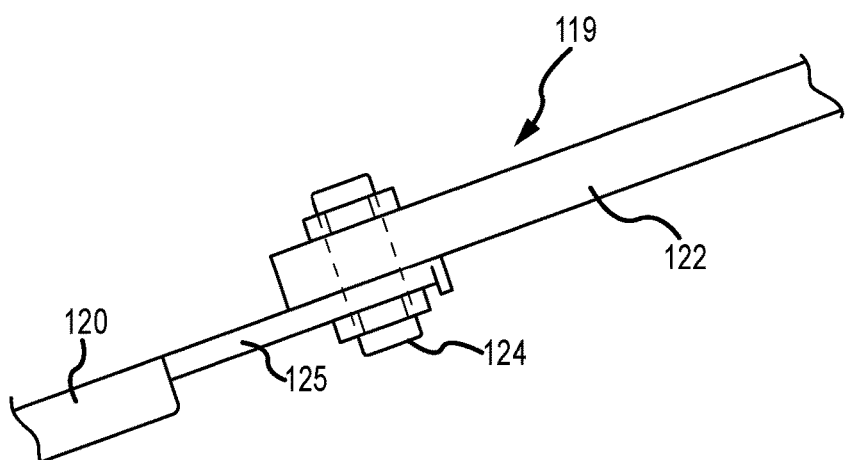
FIG. 4D is a detailed side elevation view of a component of the vehicle access ramp according to the embodiment of FIG. 4A.
Figure 5A:
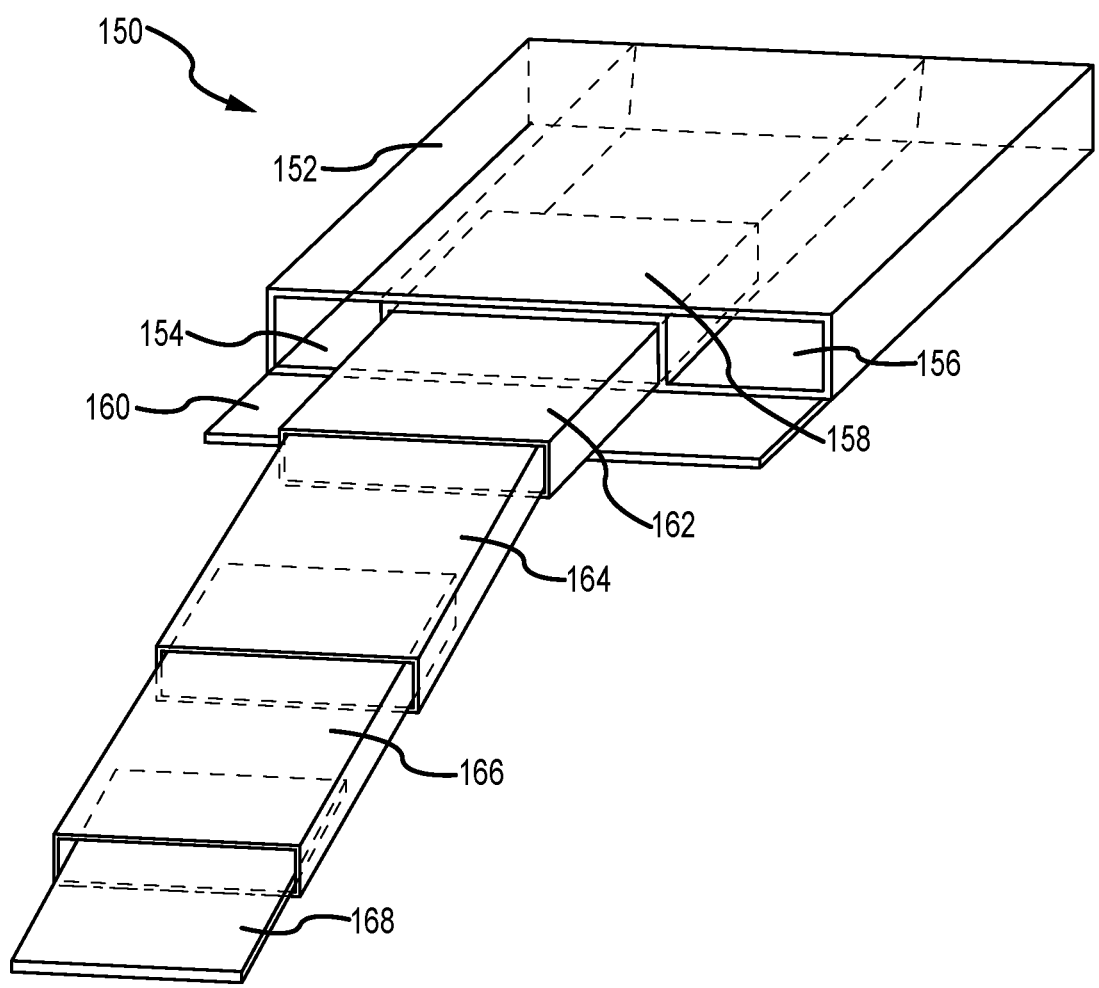
FIG. 5A is a perspective view of a vehicle access ramp according to one embodiment of the present disclosure.
Figure 5B:
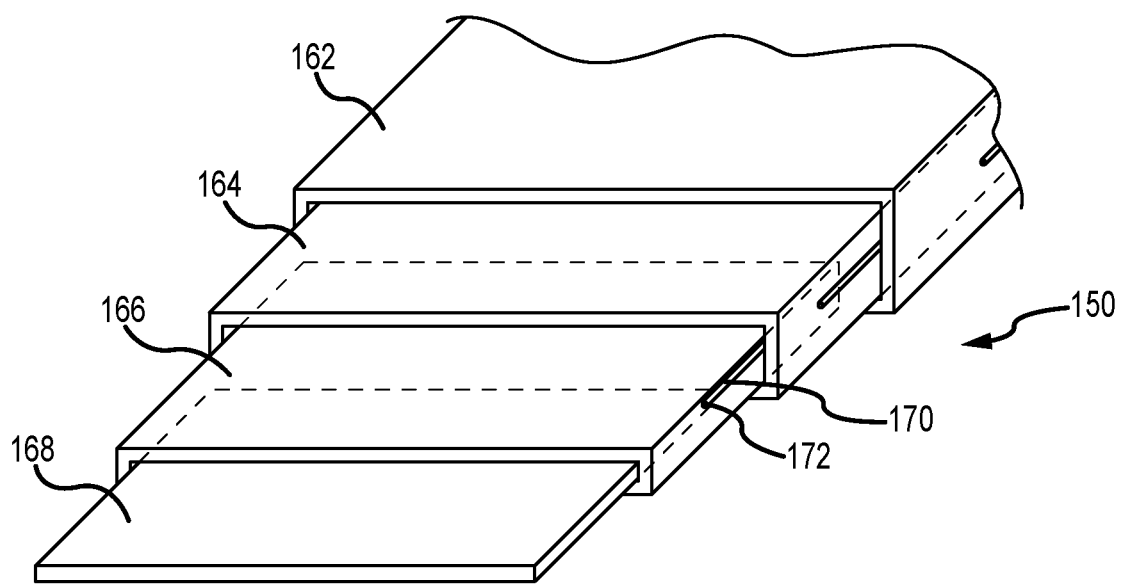
FIG. 5B is a perspective view of a vehicle access ramp component according to the embodiment of FIG. 5A.

FIGS. 4C and 4D are front and side views of a sliding mechanism contemplated for use with embodiments of the present disclosure. As shown, a linkage 119 is provided that is operable to connect two adjacent segments and provide the segments in slidable relationship at least with respect to one another. The linkage 119 comprises a first member 120 and a second member 122. The first and second members generally comprise track members, and the first member 120 is slidable along a connecting bar 125. The first member 120 and the connecting bar 125 are rotatable relative to the second member 122 at a hinged connection 124, which may comprise various known fasteners that enable rotation of connected elements. Latch or closure mechanisms are contemplated in various embodiments. As shown in FIG. 4C, leaf-spring catch members 126, 128 are provided to secure the sliding mechanism in a closed position.

FIG. 4D is a partial front elevation view of the vehicle access ramp system 99 of the embodiment of FIG. 4B. As shown, a plurality of ramp segments 82, 84, 86, 88 are provided in a nested arrangement. The support members 90 of FIG. 4D are contemplated as comprising a vertical 90a and a horizontal support 90b, with respective segments provided in communication with at least the horizontal support 90b. In some embodiments, however, vertical supports 90a are secured directly to an underside of the segments. Each of the segments is interconnected to a sliding mechanism 140, 142, 144, 146 which are contemplated as comprising the slide member shown in FIGS. 4C-4D, for example. An outermost slide member 140 comprises a wheel 132 extending therefrom. The wheel 132 is provided in and moveable relative to a track member 130 secured to a vertical partition 138 of the system 99. The vertical partition 138 extends between the upper surface 81 of the system and the lower portion 134. At least one storage compartment 136 is provided adjacent to the vertical partition 138 and on an opposing side from the ramp segments.

Figure 6A:
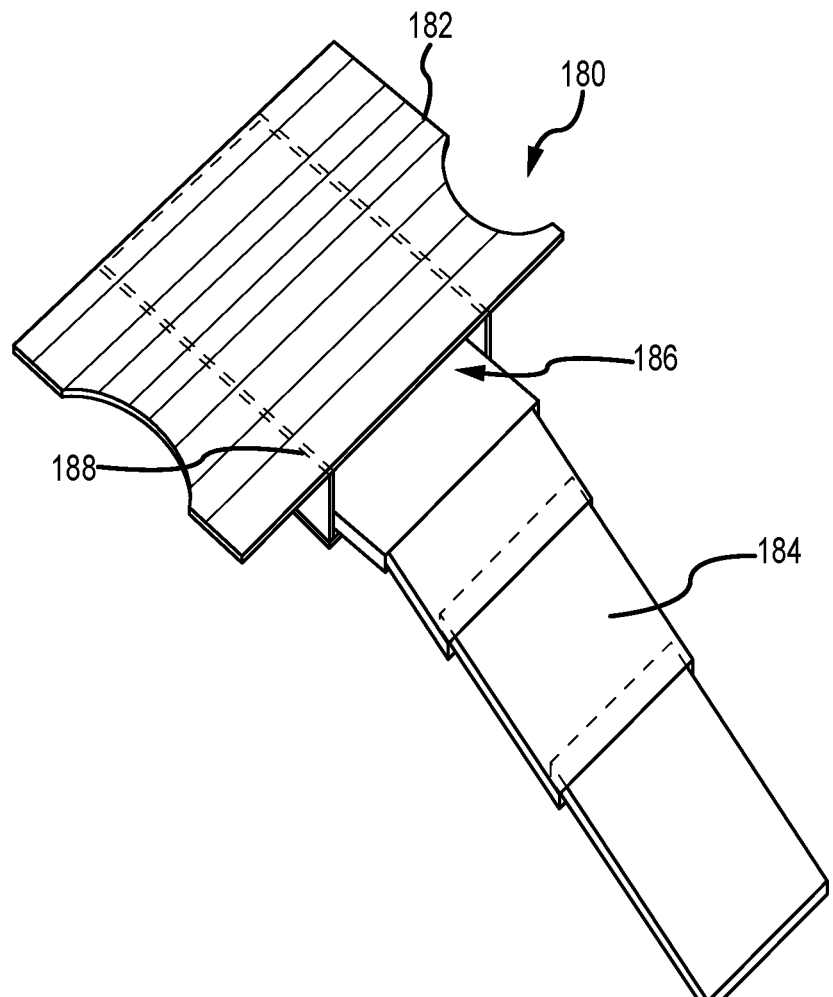
FIG. 6A is a perspective view of a vehicle access ramp system according to one embodiment of the present disclosure.

FIG. 6A is a perspective view of a vehicle access ramp system 180 according to one embodiment of the present disclosure. As shown, the system 180 comprises a housing having an upper surface 182. The upper surface 182 is operable to provide a cargo-surface replacement area in a vehicle. A ramp housing 186 is provided beneath the upper surface 182 for storing a telescoping or collapsible ramp 184 having a plurality of segments. The collapsible ramp member 184 may comprise various features as shown and described with respect to various embodiments provided herein.

Figure 6B:
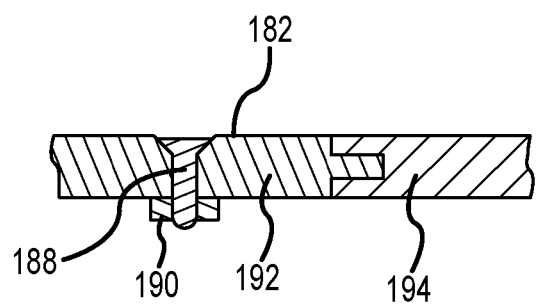
FIG. 6B is a detailed elevation view of a component of the vehicle access ramp system according to the embodiment of FIG. 6A.

FIG. 6B is a detailed cross-sectional elevation view of a portion of the device of FIG. 6A. As shown in FIG. 6B, an upper surface 182 of the system 180 is provided comprising a plurality of segments 192, 194. The segments 192, 194 are provided as adjacent tongue and groove features and are contemplated as being modular features wherein individual segments may be replaced without the need to replace an entire upper surface of the system. One or more recessed fasteners 188 are contemplated as being provided in the system to secure an upper surface 182 to a reminder of the system 180. As shown, a recessed bolt 188 and nut 190 are provided.

Figure 7A:
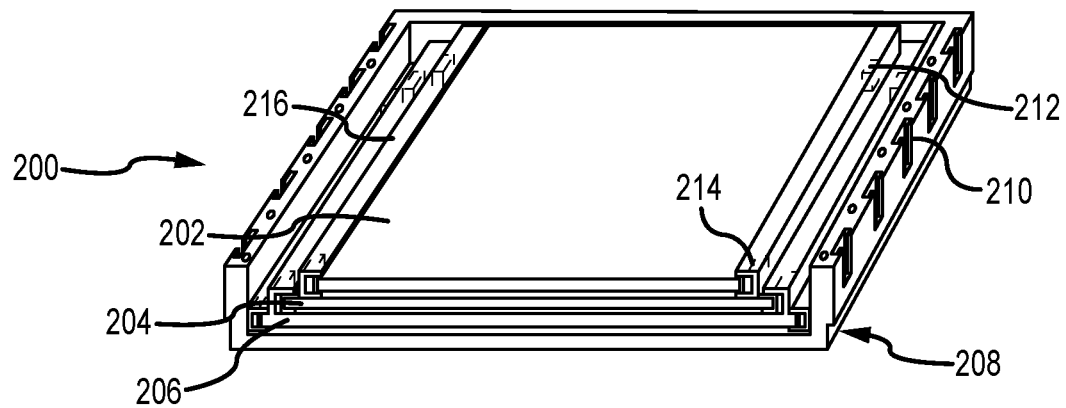
FIG. 7A is a perspective view of a vehicle access ramp system according to one embodiment of the present disclosure.

FIG. 7A is a perspective view of a vehicle access ramp 200 according to another embodiment of the present disclosure. As shown, the ramp 200 comprises a plurality of segments 202, 204, 206 that are provided in a nested, stacked, or retracted position in FIG. 7A. Although three segments are shown in FIG. 7A, no limitation with respect to the number of segments is provided herewith. The segments are provided within a base member 208, which is arranged to and operable to be provided as a substantially fixed or immovable object within the confines of a vehicle. At least one cover member (not shown in FIG. 7A) is provided that extends over the base member 208 and associated segments, and wherein the at least one cover member is operable to act as a floor surface or interior surface of a vehicle in which the ramp 200 is provided. A plurality of slots or receiving members 210 are provided along a length of the device 200 which are operable to secure, stabilize, and/or anchor the device within a vehicle.

Figure 7B:
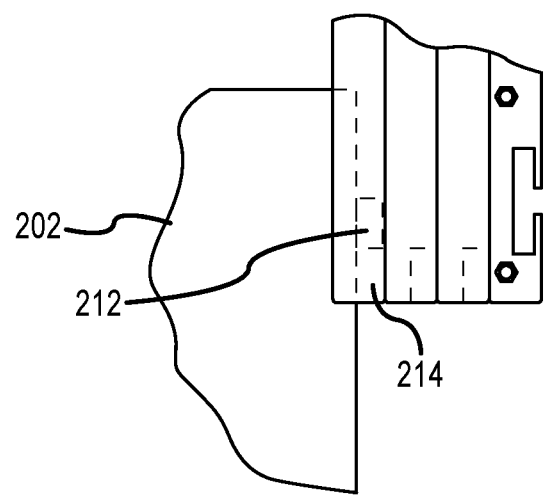
FIG. 7B is a detailed elevation view of a component of the vehicle access ramp system according to the embodiment of FIG. 7A.

FIG. 7B is a cross-sectional elevation view of a segment 202 as provided in FIG. 7A. As shown, the segment 202 comprises an integrated stop 212 which is fixed to and/or co-formed with the segment 202. The track 216 in which the segment is provided and in which the segment is translatable further comprises a stop 214 that is operable to interact with the stop 212 of the segment. A physical stop is thereby provided wherein the first stop 212 is not capable of travelling past the second stop 214 and a movement of the segment 202 is thus limited.

Figure 8A:
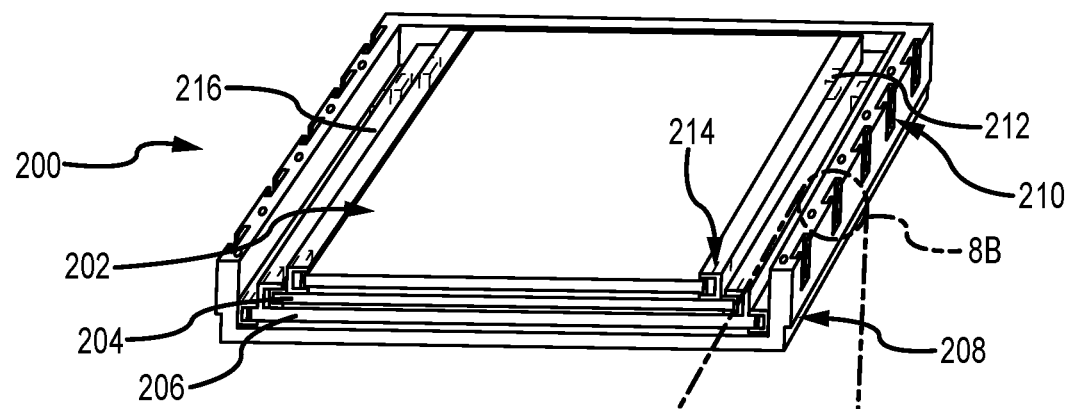
FIG. 8A is a perspective view of a vehicle access ramp according to one embodiment of the present disclosure.
Figure 8B:
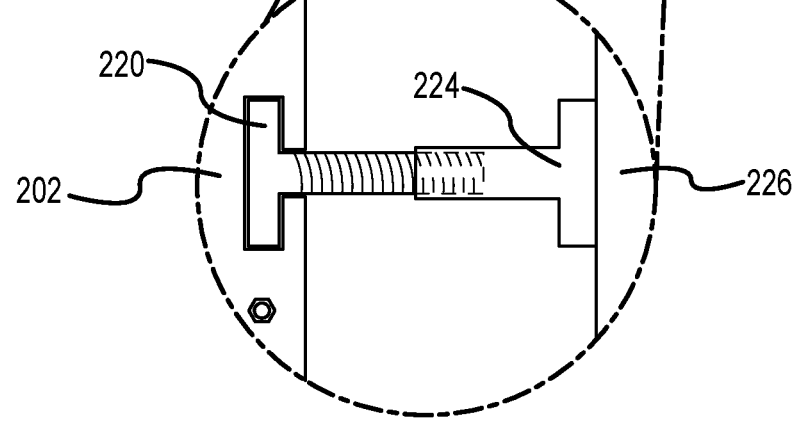
FIG. 8B is a detailed view of a component of the vehicle access ramp system of the embodiment of FIG. 8A.

FIG. 8A is a perspective view of the embodiment of FIG. 7A. For reference, the detailed area of FIG. 8B is shown in FIG. 7A. FIG. 8B is a top plan view of an anchor system contemplated for securing the base member 208 within a vehicle. As shown, at least one male fastener 220 is provided within a slot 210 of the base member 208. A female fastener 224 is secured to and extends from an interior surface 226 (e.g. sidewall) of a vehicle compartment. The male fastener 220 may then be rotated to secure the male fastener 220 and the base member 208 to the female fastener 224 and the vehicle.

Figure 9:
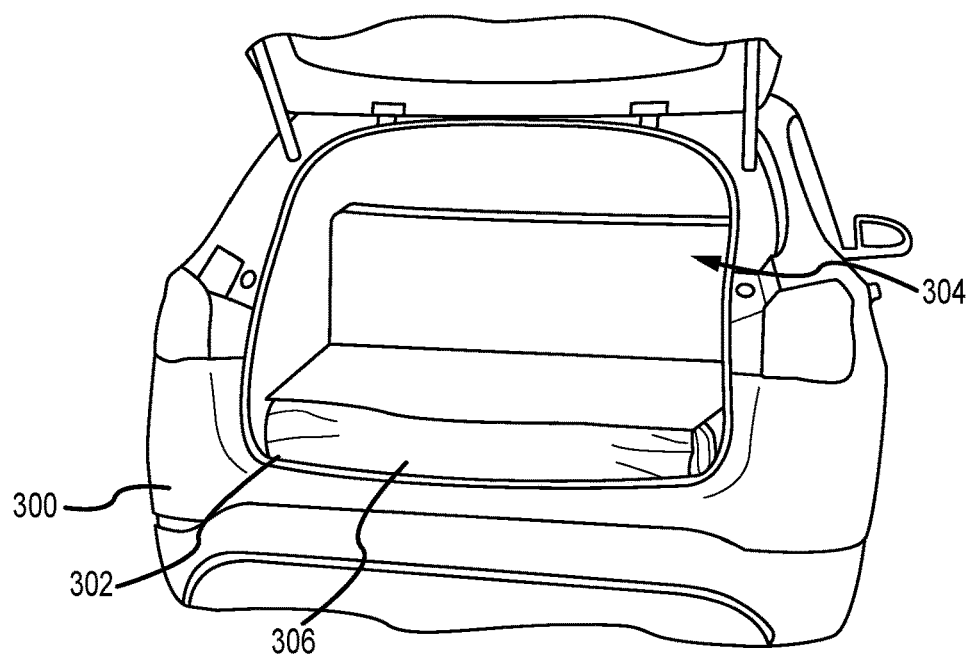
FIG. 9 is a rear perspective view of a vehicle provided with a vehicle access ramp system according to one embodiment of the present disclosure.
Figure 10:
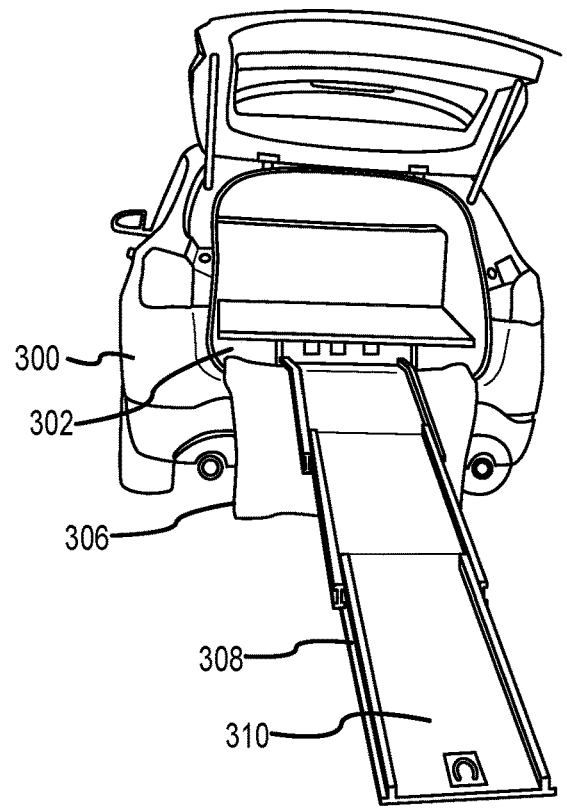
FIG. 10 is a rear perspective view of a vehicle provided with a vehicle access ramp system according to the embodiment of FIG. 9.

FIGS. 9 and 10 are rear perspective views of a vehicle 300 provided with a vehicle access ramp system 302. As shown, the vehicle 300 comprises a vehicle with a lift-gate or hatch back and a rear compartment. Within the confines of the rear compartment 304 is provided a vehicle access ramp system 302 including, but not limited to a vehicle access ramp 308 comprising a plurality of segments that are operable to be nested or collapsed in a first state (FIG. 9) and extended to a second state (FIG. 10). As shown, the second state of FIG. 10 comprises an extended position that allows an animal (for example) to walk from a ground or grade surface to an interior of the vehicle. The vehicle access ramp system 300 comprises a base member as shown and described herein that provides a floor surface for an animal, pet or various other objects to be positioned.

As further shown in FIGS. 9 and 10, the system comprises a closure member 306. The closure member 306 of the embodiment of FIGS. 9 and 10 comprises a rollable or flexible closure member. In a closed configuration (FIG. 9), the closure member 306 is rolled or folded to close off open areas of the base member including a ramp storage compartment and additional storage compartments as shown and described herein. In the extended position, the closure member 306 is unfurled to extend outwardly and/or downwardly over a rear bumper of the vehicle (FIG. 10) and provide protection against scratching that may be caused by the ramp 308 and/or other objects. In the depicted embodiment, upper surfaces of the segments comprises a padded or carpeted upper surface 310. A user-interface or pull-ring is also contemplated as being provided on one segment so a user may grasp and manipulate the ramp.

Figures 11A, 11B:
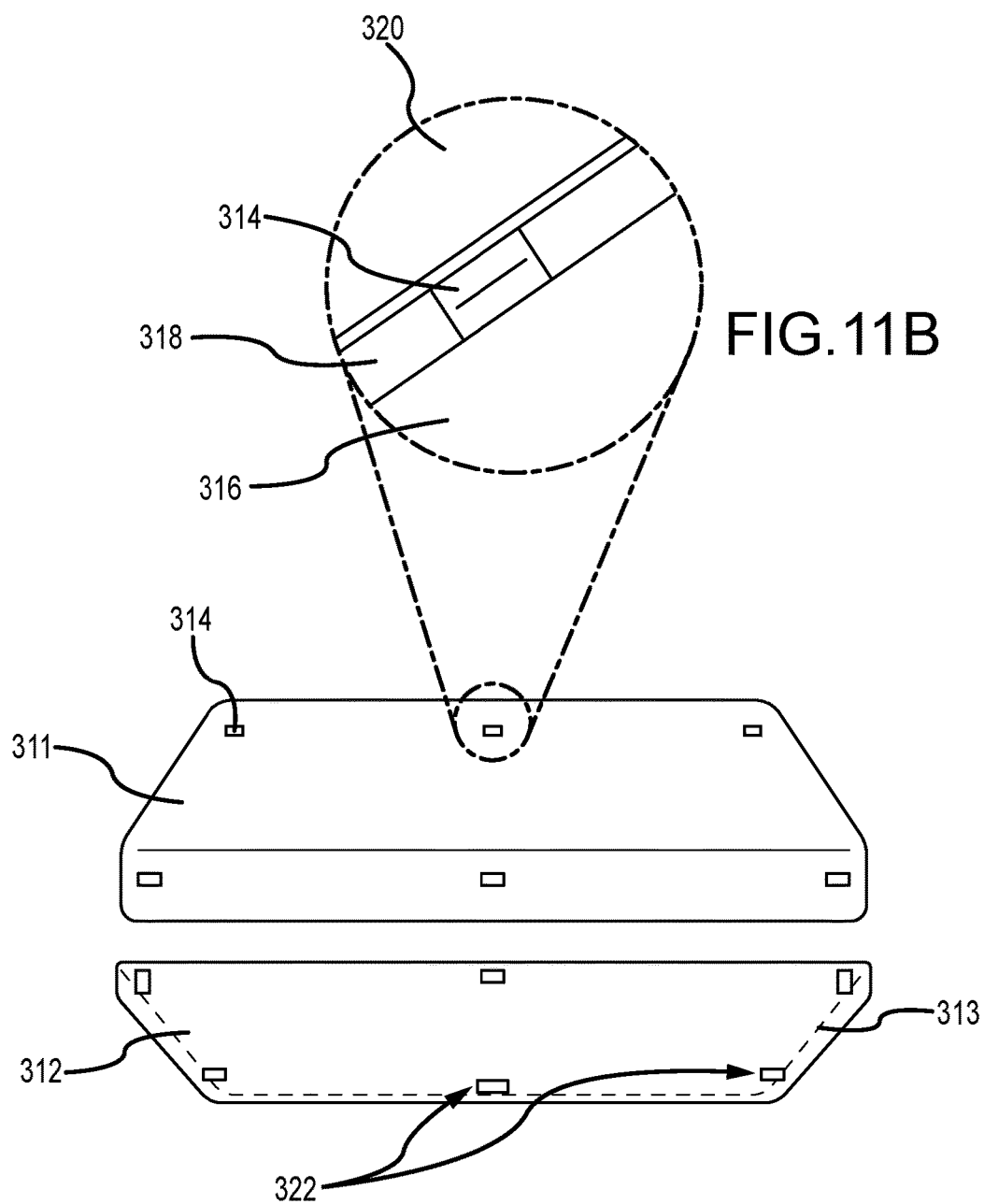
FIG. 11A is a plan view of a vehicle climate control system according to one embodiment of the present disclosure.
FIG. 11B is a detailed cross-sectional view of a component of the system of FIG. 11A.

FIG. 11A is a is a top plan view of features of a climate control system according to one embodiment of the present disclosure. As shown, panels 311, 312 are provided to cool and manage an internal environment and climate of a vehicle and enhance the overall comfort and safety of passengers including humans and pets. A first panel 311 is provided that is sized, shaped, and operable to be secured to an interior surface of an existing vehicle compartment (not shown in FIG. 11A). A second panel 312 is provided that comprises a similar construction as the first panel, but wherein the second panel 312 is sized and operable to be provided on a different portion of a vehicle including, for example, a window. The first panel 311 preferably comprises a multi-layered panel comprising a polyurethane layer and a fabric layer. FIG. 11B provides a cross-sectional view of the first panel 311 wherein the polyurethane layer 318 is provided adjacent a vehicle component 316 and the fabric layer 320 is provided as interior surface or contact surface. A magnet 314 or other fastener is impregnated within the panel 310 and is arranged to selectively secure or connect the panel 310 to the vehicle component 316.

The second panel 312 is contemplated as comprising a UV-screen that is selectively securable to a window to filter UV, provide shade, and generally mitigate heating affects from an outside environment. As shown, in FIG. 11A, the second panel 312 comprises securing members 322 that may comprise any one or more of: magnets, adhesives, suction-cups, etc. In various embodiments, a UV-screen is provided that comprises a flexible wireframe member 313 comprising an elasticity. The flexible wireframe member is preferably provided around at least a portion of the perimeter or circumference of the screen member and in some embodiments is sewn or hemmed into the screen. The flexible wireframe member provides structure to the screen, supports the screen in an installed position, and/or allows the screen to be collapsed or folded when not in use.

Figure 12:
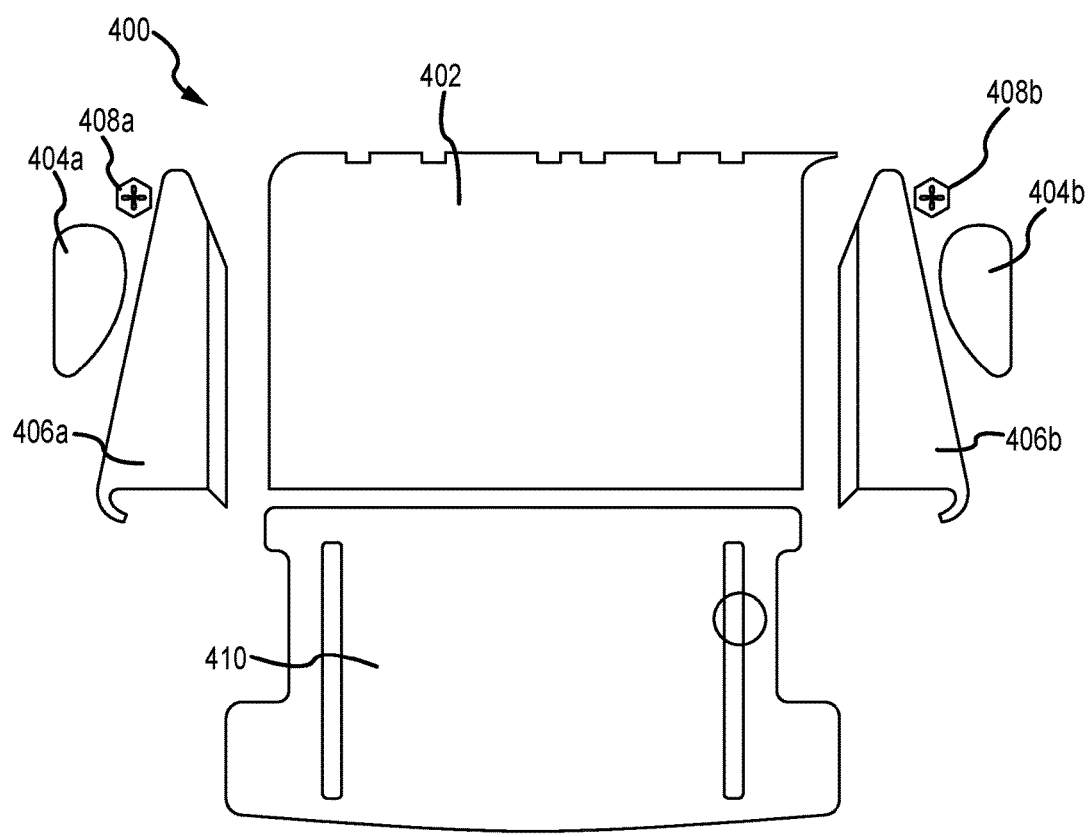
FIG. 12 is a plan view of a vehicle climate control system according to one embodiment of the present disclosure.

FIG. 12 is a top plan view of components of a climate control system according to another embodiment of the present disclosure. As shown, the system 400 comprises a plurality of panels for covering internal surfaces and components of a vehicle. Specifically, the system 400 comprises first panel 402 sized and operable to cover a backside of rear seats of a vehicle. Side panels 406a, 406b are provided that are operable to cover wheel wells, for example. Side window panels 404a, 404b are provided as UV-filters or sun-screens. A pad or cushion 410 is provided that is operable to support and provide comfort to a pet that is provided within the vehicle, for example. In some embodiments, an insulated panel is provided underneath the cushion 410.

As further shown in FIG. 12, fans 408a, 408b are provided to circulate air and provide comfort to a passenger (e.g. dog) within a vehicle. In some embodiments, the fans 408a, 408b comprise internal fans that recirculate air within the confines of a vehicle. In some embodiments, it is contemplated that the fans are provided as exhaust and/or intake fans to exhaust hot air to an outside environment and/or draw fresh air into a vehicle.

Figure 13:
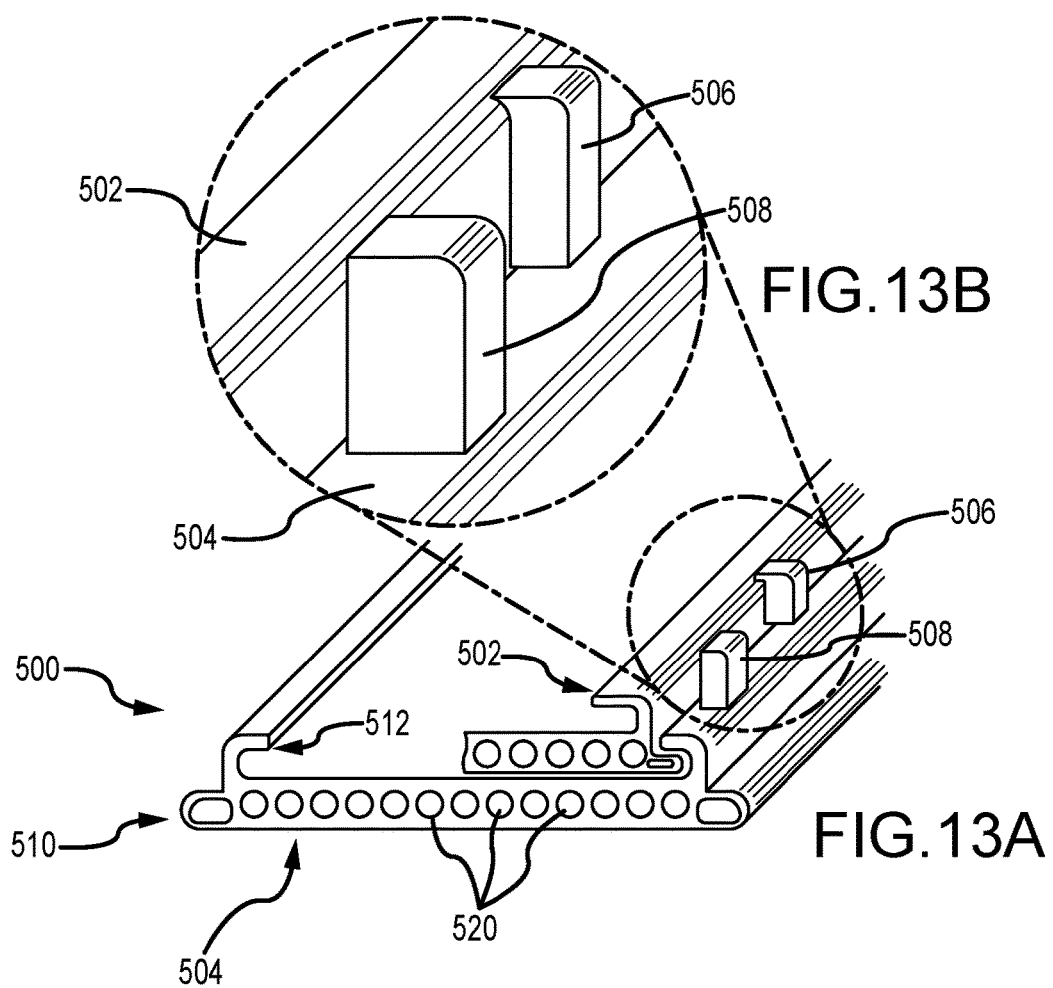
FIG. 13A is a detailed perspective view of a vehicle access ramp system according to one embodiment of the present disclosure.
FIG. 13B is a detailed perspective view of a component of the system of FIG. 13A.

FIG. 13A is a perspective view of a ramp system 500 according to another embodiment of the present disclosure. As shown, a plurality of ramp segments 502, 504 are provided. Two ramp segments are provided for illustrative purposes. However, as previously discussed, embodiments of the present disclosure are not limited to any particular number of ramp segments. The segments of FIG. 13A comprise molded or extruded members are slidable relative to each other and which are devoid of wheels, bearings, slider assemblies, etc. As shown, the segments comprise a convex portion 510 and a concave portion 512. A convex portion of one segment is operable slidably fit within the concave portion of an adjacent and larger segment. The segments preferably comprise the same general cross-sectional shape as shown in FIG. 13A, and each successive segment is smaller or larger to fit within adjacent segment(s). The segments are contemplated as comprising various plastics or resins and are preferably molded, formed, or cast elements. The segments 502, 504 are contemplated as comprising various voids 520 to reduce weight without unduly sacrificing structural integrity.

As shown in FIG. 13B, a first segment 502 is contemplated as comprising a first stop 506 which is secured to or co-formed with the segment 502. The first stop 506 comprises an extension of the segment 502 and may comprise various different shapes. A second stop 508 is provided on an adjacent segment 504. The second stop 508 extends from the segment 504 and is operable to contact the first stop 506 in a manner that prevents further movement or translation of the segment 502.

Figure 14:
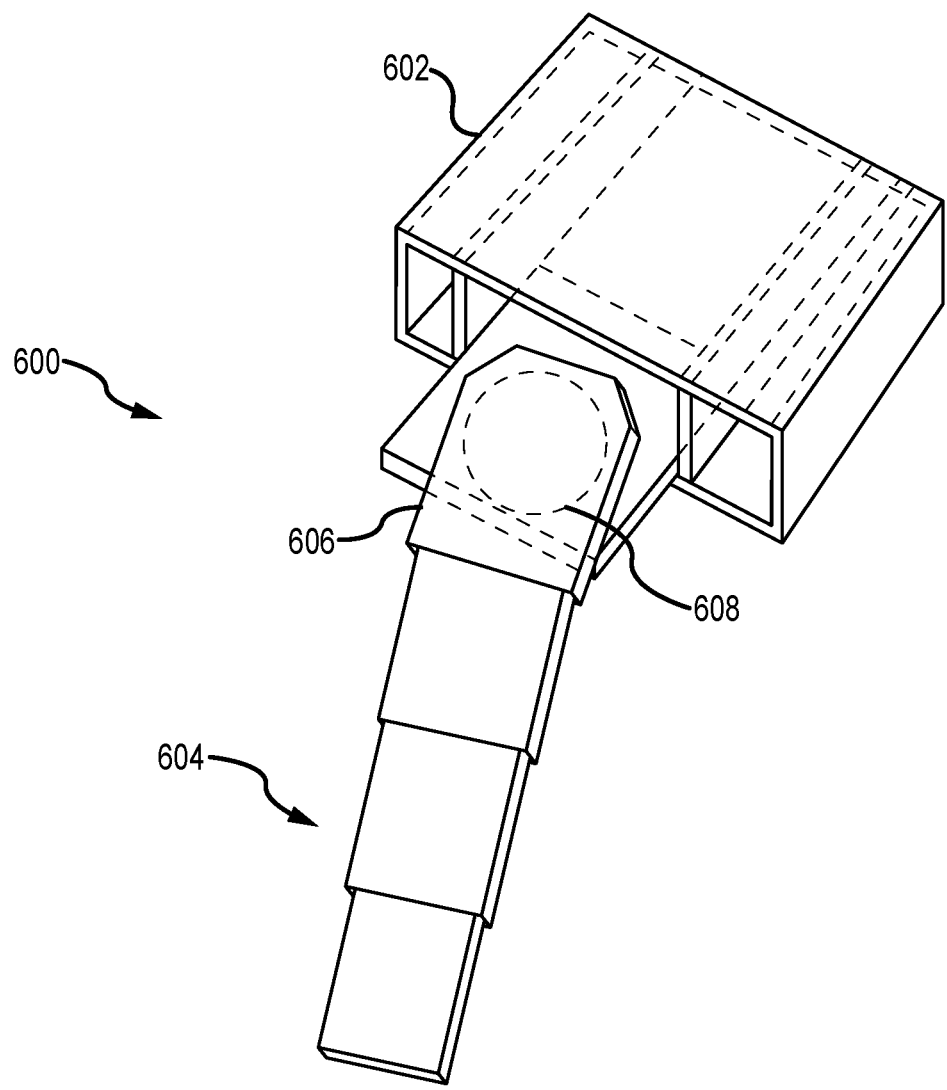
FIG. 14 is a perspective view of a vehicle access ramp system according to one embodiment of the present disclosure.
Figure 15:
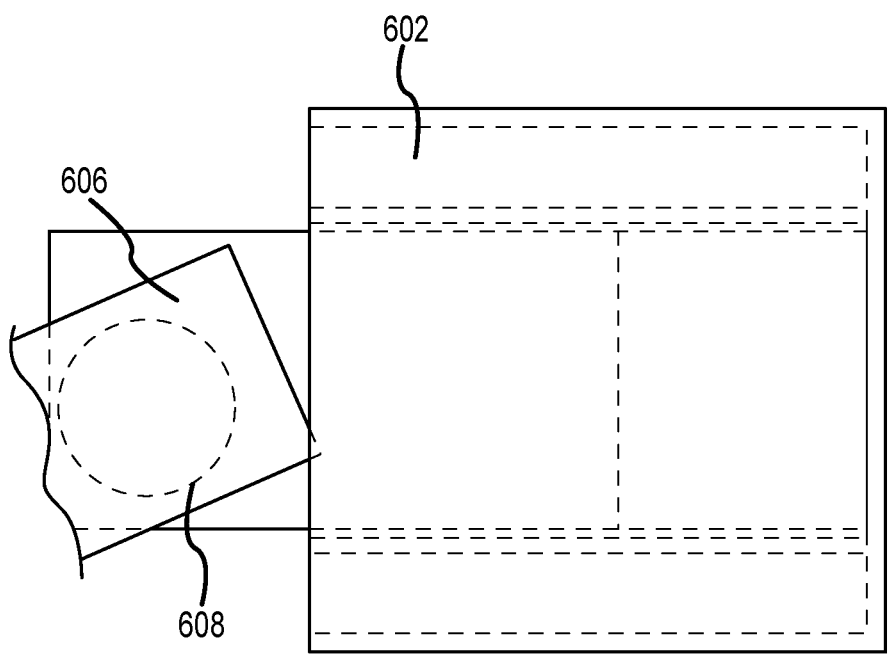
FIG. 15 is a top plan view of the system according to the embodiment of FIG. 14.

FIGS. 14-15 depict a ramp system 600 according to one embodiment of the present disclosure. The system 600 of FIGS. 14-15 comprises a rotatable ramp system that is operable for use in various areas or portions of a vehicle. Although no limitation is provided herein related to a particular location in which a ramp system may be used within a vehicle, the system 600 of FIGS. 14-15 are particularly well suited for use in a portion of a vehicle that comprises conventional side doors. Such doors open outwardly and rotate about hinges comprising a vertical axis of rotation, and are typically provide at an angle relative to the vehicle even when fully opened. Accordingly, ingress and egress from the vehicle typically requires an angle that is not orthogonal to the vehicle. It will be recognized, therefore, that the ramp 600 of the present disclosure is provided with the ability to hinge or rotate to enable or facilitate ingress and egress. Specifically, a base member 602 is provided that is adapted and arranged to be provided within the confines of a vehicle (e.g. a back seat). An extendable ramp 604 comprises a plurality of segments, and the ramp 604 is extendable and retractable relative to the base member 602. A first segment 606 comprises a member that is rotatable about a vernally vertical axis such that the ramp 604 may extend from the base member 602 at a variety of user-selected angles. A rotatable member 608 is provided which, in at least some embodiments, comprises a bearing surface about which the ramp 604 can rotate. In various embodiments, including but not limited to the embodiment shown in FIGS. 14-15, vehicle access ramp systems of the present disclosure are securable to a vehicle using an existing seat belt. For example, it is contemplated that hooks, loops, cleats, or similar features are provided on a base member of a ramp system for selectively receiving seat belts or other existing anchor systems provided within vehicles.

Various different embodiments are provided herein. It is contemplated that the various features of various different embodiments are contemplated for use with other embodiments of the disclosure, even if such a combination is not specifically shown or described herein. For example, ramp features shown and described with respect to a particular embodiment are not limited to that particular embodiment are contemplated for use with other embodiments. One of ordinary skill in the art would readily understand how to combine various inventive features of the present disclosure with other inventive features of the present disclosure.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A vehicle access ramp comprising:
a primary housing operable to fit within a portion of a vehicle;
the primary housing comprising an upper housing surface, and a plurality of interior wall members, wherein the interior wall members comprise substantially vertical members with a first end that is operable to rest on an interior surface of the vehicle, and wherein the upper housing surface extends laterally away from the interior wall members;
the upper housing surface configured to replace a pre-existing cargo surface of a vehicle;
an extensible ramp provided between two of the interior wall members;
the extensible ramp comprising a plurality of segments and wherein each of the plurality of segments is translatable relative to an adjacent segment and relative to the primary housing;
wherein at least one of the segments comprises a hinge member and is rotatable relative to the primary housing about at least one axis;
wherein at least one of the plurality of segments comprises a molded member having a convex portion and a concave portion, the convex portion operable to be received by a first adjacent segment and the concave portion operable to receive a second adjacent segment;
first and second storage compartments provided on opposing sides of the interior wall members relative to the extensible ramp;
wherein the extensible ramp comprises a first position of storage and a second position of use, the first position of storage comprising a position wherein each of the plurality of segments is confined within primary housing, and the second position of use comprising an extended position wherein the extensible ramp extends between the primary housing and a location that is vertically and horizontally offset from the primary housing; and
a flexible cover member operable to substantially enclose the at least one storage compartment when the extensible ramp is provided in the first position, wherein the cover member comprises a rollable mat that is operable to substantially enclose the first and second storage compartments and is further operable to be provided as a buffer between the extensible ramp and a portion of a vehicle when the flexible cover member is provided in an unrolled or deployed state.

2. The vehicle access ramp of claim 1, wherein the plurality of segments comprises at least three segments.

3. The vehicle access ramp of claim 1, wherein at least one of the plurality of segments comprises a stop member to limit movement of the segments.

4. The vehicle access ramp of claim 1, wherein each of the plurality of segments comprises an upper surface and wherein each of the upper surfaces comprise a pad or a mat to increase friction.

5. The vehicle access ramp of claim 1, further comprising at least one fastener to secure the primary housing to an interior surface of a vehicle.

6. The vehicle access ramp of claim 1, wherein the plurality of segments comprise molded plastic members.

7. A vehicle access ramp comprising:
a primary housing operable to fit within a portion of a vehicle;
the primary housing comprising an upper housing surface, the upper housing surface being arranged to replace an existing cargo surface of a vehicle;
an extensible ramp provided at least partially within the primary housing;
the extensible ramp comprising a plurality of segments and wherein each of the plurality of segments is translatable relative to an adjacent segment and relative to the primary housing;
wherein at least one of the segments comprises a hinge member and is rotatable relative to the primary housing about at least one axis;
a first storage compartment provided within the primary housing for receiving the extensible ramp;
a second storage compartment provided within the primary housing;
the first storage compartment and the second storage compartment separated by an interior wall member, and wherein the second storage compartment is provided on an opposing side of the interior wall member relative to the extensible ramp;

wherein the extensible ramp comprises a first position of storage and a second position of use, the first position of storage comprising a position wherein each of the plurality of segments is confined within primary housing, and the second position of use comprising an extended position wherein the extensible ramp extends between the primary housing and a location that is vertically and horizontally offset from the primary housing; and a flexible cover member operable to substantially enclose the at least one storage compartment when the extensible ramp is provided in the first position and wherein the flexible cover member comprises at least one of a buffer and a protector when extended.

8. The vehicle access ramp of claim 1, wherein at least some of the surfaces of the vehicle access ramp comprise a fabric.

9. The vehicle access ramp of claim 7, wherein each of the plurality of segments comprises a molded plastic member.

10. The vehicle access ramp of claim 7, wherein at least one of the plurality of segments comprises a stop member to limit movement of the segments.

11. The vehicle access ramp of claim 7, wherein the plurality of segments comprises at least three segments.

12. The vehicle access ramp of claim 7, wherein the primary housing comprises a third storage compartment, and wherein the second and third storage compartments are provided on opposing sides of the extensible ramp and external to the first storage compartment.

13. The vehicle access ramp of claim 7, wherein each of the plurality of segments comprises an upper surface and wherein each of the upper surfaces comprise a pad or a mat to increase friction.

14. The vehicle access ramp of claim 7, further comprising at least one fastener to secure the primary housing to an interior surface of a vehicle.

15. The vehicle access ramp of claim 7, wherein at least some of the surfaces of the vehicle access ramp comprise a fabric.

* * * * *